(12) United States Patent
Kim et al.

(10) Patent No.: US 11,816,297 B2
(45) Date of Patent: Nov. 14, 2023

(54) ELECTRONIC DEVICE HAVING INCREASED INPUT SENSING SENSITIVITY

(71) Applicant: SAMSUNG DISPLAY CO., LTD., Yongin-si (KR)

(72) Inventors: Changbum Kim, Gyeonggi-do (KR); Jina Kang, Hwaseong-si (KR); Jinwoo Kim, Hwaseong-si (KR); Byeongkyu Jeon, Busan (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/812,251

(22) Filed: Jul. 13, 2022

(65) Prior Publication Data
US 2023/0138868 A1 May 4, 2023

(30) Foreign Application Priority Data
Oct. 29, 2021 (KR) .......................... 10-2021-0146783

(51) Int. Cl.
*G06F 3/044* (2006.01)
*G06F 3/041* (2006.01)

(52) U.S. Cl.
CPC .......... *G06F 3/0442* (2019.05); *G06F 3/0446* (2019.05); *G06F 3/04162* (2019.05)

(58) Field of Classification Search
CPC .................................................. G06F 3/0442
See application file for complete search history.

(56) References Cited

U.S. PATENT DOCUMENTS

| 10,379,694 B2 | 8/2019 | Park et al. |
| 10,444,870 B2 | 10/2019 | Kadowaki et al. |
| 2015/0002415 A1 | 1/2015 | Lee et al. |
| 2016/0062519 A1* | 3/2016 | Park ...................... G06F 3/0446 345/173 |
| 2016/0266663 A1* | 9/2016 | Holsen ................ G06F 3/04164 |
| 2017/0255295 A1* | 9/2017 | Tanemura ............. G06F 1/3262 |
| 2019/0146602 A1* | 5/2019 | Kadowaki ............. G06F 3/0418 345/174 |
| 2019/0179429 A1* | 6/2019 | Yamamoto ............ G06F 3/0412 |
| 2020/0225779 A1* | 7/2020 | Katsurahira ........ G06F 3/04162 |

FOREIGN PATENT DOCUMENTS

| KR | 10-1489813 | 2/2015 |
| KR | 10-2016-0025443 | 3/2016 |

* cited by examiner

*Primary Examiner* — Chun-Nan Lin
(74) *Attorney, Agent, or Firm* — F. Chau & Associates, LLC

(57) ABSTRACT

An electronic device includes a display panel, an input sensor disposed on the display panel and including first sensing electrodes extending in a first direction and second sensing electrodes extending in a second direction crossing the first direction, and a sensor controller connected to the input sensor. First and second areas are defined in the input sensor based on an input position to which an input by an input device is applied. The input position is located in the first area and not in the second area. The sensor controller applies a first signal to at least one first sensing electrode disposed in the first area and at least one second sensing electrode disposed in the first area and applies a second signal having an opposite phase to a phase of the first signal to the other first and second sensing electrodes disposed in the second area.

16 Claims, 17 Drawing Sheets

ELECTRONIC DEVICE HAVING INCREASED INPUT SENSING SENSITIVITY

CROSS-REFERENCE TO RELATED APPLICATIONS

This U.S. non-provisional patent application claims priority under 35 U.S.C. § 119 to Korean Patent Application No. 10-2021-0146783, filed on Oct. 29, 2021, the disclosure of which is incorporated by reference herein in its entirety.

TECHNICAL FIELD

Embodiments of the present disclosure relate to an electronic device with increased sensing sensitivity and image quality.

DISCUSSION OF RELATED ART

An electronic device may sense an external input applied thereto from outside of the electronic device. The external input may be a user input. The user input may include various forms of external inputs such as, for example, a part of a user's body, light, heat, or pressure. The electronic device may obtain coordinates of a pen providing the external input using an electromagnetic resonance (EMR) scheme or an active electrostatic (AES) scheme.

SUMMARY

The present disclosure provides an electronic device with improved sensing sensitivity and image quality.

Embodiments of the present disclosure provide an electronic device including a display panel, an input sensor disposed on the display panel and including a plurality of first sensing electrodes extending in a first direction and a plurality of second sensing electrodes extending in a second direction crossing the first direction, and a sensor controller connected to the input sensor. A first area and a second area are defined in the input sensor based on an input position to which an input generated by an input device is applied. The input position is located in the first area and is not located in the second area. The sensor controller applies a first signal to at least one first sensing electrode disposed in the first area among the first sensing electrodes and to at least one second sensing electrode disposed in the first area among the second sensing electrodes, and applies a second signal having an opposite phase to a phase of the first signal to first sensing electrodes disposed in the second area among the first sensing electrodes and second sensing electrodes disposed in the second area among the second sensing electrodes.

In an embodiment, the input sensor further includes a first sensor part including the at least one first sensing electrode disposed in the first area among the first sensing electrodes and a second sensor part including the at least one second sensing electrode disposed in the first area among the second sensing electrodes, and the first sensor part crosses the second sensor part with respect to the input position.

In an embodiment, the input sensor further includes a plurality of compensation parts including the other first and second sensing electrodes disposed in the second area, and the compensation parts are spaced apart from each other with at least one of the first sensor part and the second sensor part interposed therebetween.

In an embodiment, the first area has substantially a same size as a size of the second area.

In an embodiment, the input sensor operates in a first mode in which the input generated by the input device is sensed and in a second mode in which an input generated by a user's touch is sensed.

In an embodiment, the sensor controller senses an approach of the input device in the second mode by applying an uplink signal to the first sensing electrodes and the second sensing electrodes, and operates in the first mode when the approach of the input device is sensed via the first sensing electrodes and the second sensing electrodes.

In an embodiment, the sensor controller senses the approach of the input devices by receiving a downlink signal from the input device via the first sensing electrodes and the second sensing electrodes.

In an embodiment, the sensor controller alternately applies a first uplink signal and a second uplink signal, which have opposite phases to each other, to the first sensing electrode and the second sensing electrode in the second mode.

In an embodiment, the sensor controller detects a first input position at which the input is sensed in the input sensor and defines the first area and the second area based on the detected first input position when the input generated by the input device is sensed via the at least one first sensing electrode and the at least one second sensing electrode in the first mode.

In an embodiment, when the input position to which the input generated by the input device is applied moves from the first input position to a second input position different from the first input position, the sensor controller again defines the first area and the second area in the input sensor based on the second input position.

In an embodiment, the input sensor includes an active area including the first area and the second area, and the sensor controller determines a width in the second direction of the first sensor part to correspond to about 20 percent to about 40 percent of a width in the second direction of the active area in the first mode and determines a width in the first direction of the second sensor part to correspond to about 20 percent to about 40 percent of a width in the first direction of the active area.

Embodiments of the present disclosure provide an electronic device including a display panel, and an input sensor disposed on the display panel. The input sensor operates in a first mode in which an input generated by an input device is sensed and a second mode in which an input generated by a user's touch is sensed. The input sensor includes a first area in which an input position is located and a second area in which the input position is not located. The first and second areas are defined based on the input position to which the input generated by the input device is applied. The electronic device further includes a sensor controller connected to the input sensor. The input sensor further includes a first sensor part extending in a first direction in the first area, a second sensor part extending in a second direction crossing the first direction in the first area, and a compensation part disposed in the second area. The sensor controller applies a first signal to the first sensor part and the second sensor part and applies a second signal having a phase opposite to a phase of the first signal to the compensation part in the first mode.

According to embodiments of the present disclosure, a flicker phenomenon caused when a data signal collides or interferes with the uplink signal may be removed or reduced, and as a result, image quality may be increased.

According to embodiments of the present disclosure, signals having opposite phases to each other are respectively provided to the area where the input by the input device is applied and to the area where the input by the input device is not applied in the input sensor, and thus, the flicker phenomenon may be removed or reduced.

BRIEF DESCRIPTION OF THE DRAWINGS

The above and other features of the present disclosure will become readily apparent by describing in detail embodiments thereof with reference to the accompanying drawings, in which.

DETAILED DESCRIPTION

Figure 1:
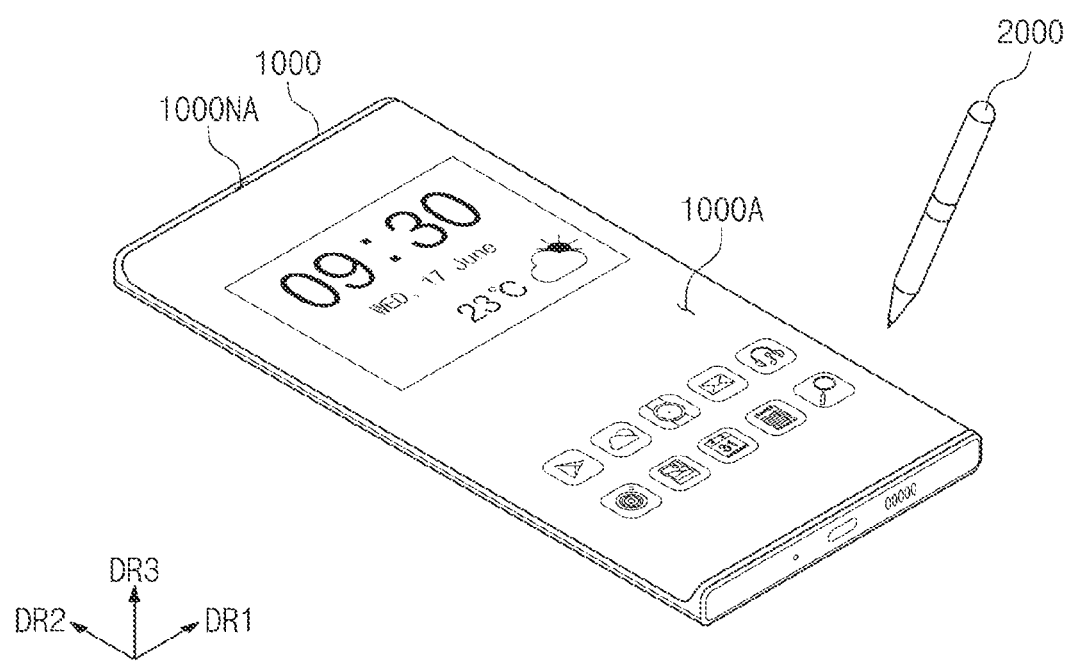
FIGS. 1 and 2 are perspective views of an electronic device and an input device according to embodiments of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

As used herein, the term "and/or" includes any and all combinations of one or more of the associated listed items.

It will be understood that, although the terms first, second, etc., may be used herein to describe various elements, these elements should not be limited by these terms. These terms are only used to distinguish one element from another element. Thus, a first element discussed below could be termed a second element without departing from the teachings of the present disclosure.

As used herein, the singular forms, "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationships between components should be interpreted in a like fashion.

It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art.

FIG. 1 is a perspective view of an electronic device 1000 and an input device 2000 according to an embodiment of the present disclosure.

Referring to FIG. 1, the electronic device 1000 may be a device that is activated in response to electrical signals. For example, the electronic device 1000 may be a mobile phone, a tablet computer, a car navigation unit, a game unit, or a wearable device. However, the electronic device 1000 is not limited thereto. In FIG. 1, the mobile phone is shown as a representative example of the electronic device 1000.

The electronic device 1000 may include an active area 1000A and a peripheral area 1000NA, which are defined therein. The electronic device 1000 may display an image through the active area 1000A. The active area 1000A may include a plane defined by a first direction DR1 and a second direction DR2. The peripheral area 1000NA may surround the active area 1000A.

A thickness direction of the electronic device 1000 may be substantially parallel to a third direction DR3 crossing the first direction DR1 and the second direction DR2. That is, the thickness direction of the electronic device 1000 may correspond to the third direction DR3 crossing the first direction DR1 and the second direction DR2. Thus, the third direction DR3 may also be referred to herein as the thickness direction of the electronic device 1000. Accordingly, front (or upper) and rear (or lower) surfaces of each member of the electronic device 1000 may be defined with respect to the third direction DR3.

The electronic device 1000 may sense an external input applied thereto from outside of the electronic device 1000. The external input may include a variety of forms of external inputs, such as, for example, a part of the user's body, light, heat, pen, or pressure. The external inputs may be referred to as a second input.

The electronic device 1000 shown in FIG. 1 may sense an input generated by a user's touch or an input generated by an input device. The input device 2000 may mean a device other than the part of the user's body. The input generated by the input device 2000 may be referred to as a first input. For example, the input device 2000 may be an active pen, a stylus pen, a touch pen, an electronic pen, etc. Hereinafter, the active pen will be described as a representative example of the input device 2000.

The electronic device 1000 and the input device 2000 may communicate bi-directionally with each other. The electronic device 1000 may apply an uplink signal to the input device 2000. The uplink signal may include a synchronization signal or information about the electronic device 1000. However, the uplink signal is not limited thereto. The input device 2000 may apply a downlink signal to the electronic device 1000. The downlink signal may include a synchronization signal or a status information of the input device 2000. For example, the downlink signal may include coordinate information of the input device 2000, battery information of the input device 2000, slope information of the input device 2000, and/or various information stored in the input device 2000. However, the downlink signal is not limited thereto. The uplink signal and the downlink signal will be described in detail below.

Figure 2:
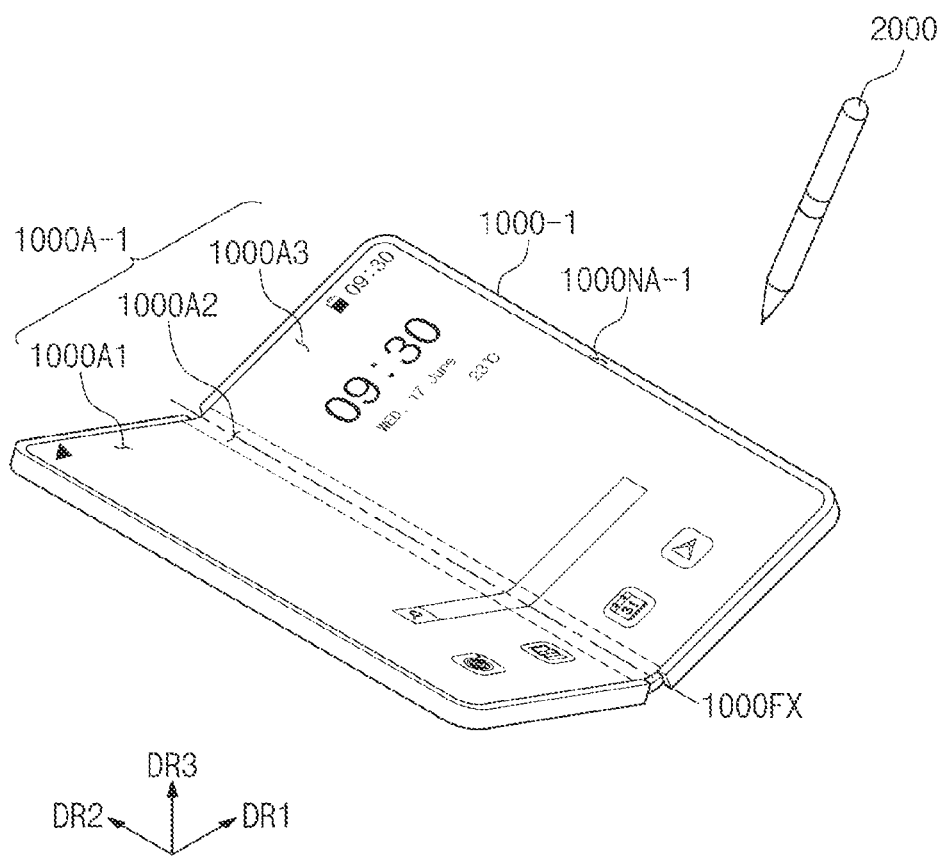

FIG. 2 is a perspective view of an electronic device 1000-1 and an input device 2000 according to an embodiment of the present disclosure. In FIG. 2, the same reference numerals denote the same elements in FIG. 1, and thus, detailed descriptions of the same elements will be omitted.

Referring to FIG. 2, the electronic device 1000-1 may include an active area 1000A-1 and a peripheral area 1000NA-1, which are defined therein. The peripheral area 1000NA-1 may surround the active area 1000A-1. The electronic device 1000-1 may display an image through an active area 1000A-1. FIG. 2 shows the electronic device 1000-1 folded at a predetermined angle. When the electronic device 1000-1 is in an unfolded state, the active area 1000A-1 may include a plane defined by the first direction DR1 and the second direction DR2.

The active area 1000A-1 may include the first active area 1000A1, a second active area 1000A2, and a third active area 1000A3. The first active area 1000A1, the second active area 1000A2, and the third active area 1000A3 may be sequentially arranged in the first direction DR1. The second active area 1000A2 may be folded with respect to a folding axis 1000FX extending in the second direction DR2. Accordingly, the first active area 1000A1 and the third active area 1000A3 may be referred to as non-folding areas, and the second active area 1000A2 may be referred to as a folding area.

When the electronic device 1000-1 is folded, the first active area 1000A1 and the third active area 1000A3 may face each other. Accordingly, in an embodiment, the active area 1000A-1 is not exposed to the outside in a state where the electronic device 1000-1 is completely folded. This may be referred to as an in-folding state. However, this is merely an example, and the folding operation of the electronic device 1000-1 is not limited thereto.

As an example, according to an embodiment, the electronic device 1000-1 may be folded to allow the first active area 1000A1 and the third active area 1000A3 to face directions opposite to each other. In this case, the active area 1000A-1 may be exposed to the outside. This may be referred to as an out-folding state.

The electronic device 1000-1 may be operated in only one of the in-folding operation or the out-folding operation. According to an embodiment, the electronic device 1000-1 may be operated in both the in-folding operation and the out-folding operation. In this case, the second active area 1000A2 of the electronic device 1000-1 may be inwardly folded (in-folding) and outwardly folded (out-folding).

FIG. 2 shows one folding area and two non-folding areas as a representative example. However, the number of folding areas and the number of non-folding areas is not limited thereto. As an example, the electronic device 1000-1 may include three or more non-folding areas and a plurality of folding areas disposed between the non-folding areas adjacent to each other.

As shown in FIG. 2, the folding axis 1000FX extends in the second direction DR2. However, embodiments of the present disclosure are not limited thereto. For example, in an embodiment, the folding axis 1000FX may extend in a direction substantially parallel to the first direction DR1. In this case, the first active area 1000A1, the second active area 1000A2, and the third active area 1000A3 may be sequentially arranged in the second direction DR2.

The active area 1000A-1 may overlap at least one electronic module. For example, the electronic modules may include a camera module and a proximity illumination sensor. The electronic modules may receive an external input applied thereto through the active area 1000A-1 or may provide an output through the active area 1000A-1. A portion of the active area 1000A-1 overlapping the camera module and the proximity illumination sensor may have a transmittance higher than that of the other portion of the active area 1000A-1. Accordingly, in an embodiment, an area to dispose the electronic modules in a peripheral area NAA2 around the active area 1000A-1 is not provided. As a result, a ratio of the active area 1000A-1 to a front surface of the electronic device 1000-1 may increase.

The electronic device 1000-1 and the input device 2000 may bi-directionally communicate with each other. The electronic device 1000-1 may apply an uplink signal to the input device 2000. The input device 2000 may apply a downlink signal to the electronic device 1000-1. The electronic device 1000-1 may sense a position and coordinates of the input device 2000 using the signal provided from the input device 2000.

Figure 3:
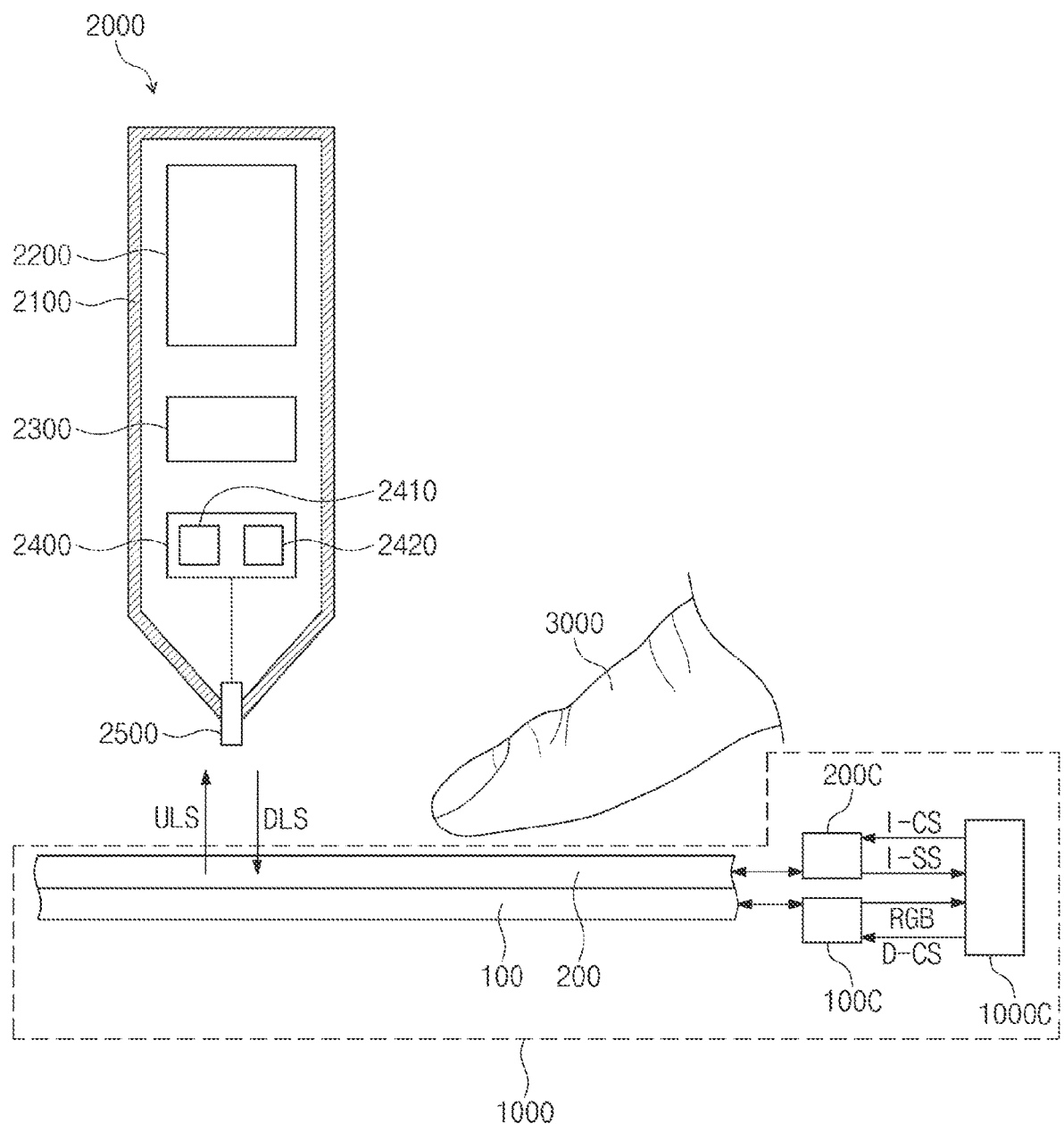
FIG. 3 is a block diagram of an electronic device and an input device according to an embodiment of the present disclosure.

FIG. 3 is a block diagram of the electronic device 1000 and the input device 2000 according to an embodiment of the present disclosure.

Referring to FIG. 3, the electronic device 1000 may include a display panel 100, an input sensor 200, a display controller 100C, a sensor controller 200C, and a main controller 1000C.

The display panel 100 may generate the image. The display panel 100 may be a light emitting type display panel. For example, the display panel 100 may be an organic light emitting display panel, a quantum dot display panel, a micro-LED display panel, or a nano-LED display panel. However, the display panel 100 is not limited thereto.

The input sensor 200 may be disposed on the display panel 100. The input sensor 200 may sense an input applied thereto from outside of the electronic device 1000. The input sensor 200 may sense the first input generated by the input device 2000 and the second input generated by a user's body 3000.

The main controller 1000C may control an overall operation of the electronic device 1000. For example, the main controller 1000C may control an operation of the display controller 100C and the sensor controller 200C. The main controller 1000C may include at least one microprocessor. The main controller 1000C may also be referred to as a host.

The display controller 100C may control a drive of the display panel 100. The main controller 1000C may further include a graphics controller. The display controller 100C may receive image data RGB and a control signal D-CS from the main controller 1000C. The control signal D-CS may include a variety of signals. For example, the control signal D-CS may include an input vertical synchronization signal, an input horizontal synchronization signal, a main clock, and a data enable signal. The display controller 100C may generate a vertical synchronization signal and a horizontal synchronization signal based on the control signal D-CS to control a timing at which signals are applied to the display panel 100.

The sensor controller 200C may control the input sensor 200. The sensor controller 200C may receive a control signal I-CS from the main controller 1000C. The control signal I-CS may include a mode determination signal to determine a driving mode of the sensor controller 200C and a clock signal. The sensor controller 200C may be operated in the first mode to sense the first input by the input device 2000 or in the second mode to sense the second input by the user's body 3000 based on the control signal I-CS. That is, the sensor controller 200C may control the input sensor 200 in the first mode or the second mode based on the mode determination signal.

The sensor controller 200C may calculate coordinate information of an input position of the first input or the second input based on the signal from the input sensor 200, and may apply a coordinate signal I-SS having the coordinate information to the main controller 1000C. The main controller 1000C may perform an operation corresponding to the user's input based on the coordinate signal I-SS. For example, the main controller 1000C may drive the display controller 100C based on the coordinate signal I-SS such that the display panel 100 displays a new application image.

The input device 2000 may include a housing 2100, a power supply 2200, a controller 2300, a communication module 2400, and a pen electrode 2500. However, elements of the input device 2000 are not limited thereto. For example, the input device 2000 may further include an electrode switch to switch a signal transmission mode or a signal reception mode, a pressure sensor to sense a pressure, a memory to store information, or a gyro sensor to sense a rotation.

The housing 2100 may have a pen shape and may include an accommodating space defined therein. The power supply 2200, the controller 2300, the communication module 2400, and the pen electrode 2500 may be accommodated in the accommodating space defined in the housing 2100.

The power supply 2200 may supply power to modules in the input device 2000, e.g., the controller 2300, the communication module 2400, etc. The power supply 2200 may include a battery or a high capacity capacitor.

The controller 2300 may control an operation of the input device 2000. The controller 2300 may be, but is not limited to, an application-specific integrated circuit (ASIC). The controller 2300 may be configured to operate according to a designed program.

The communication module 2400 may include a transmitter circuit 2410 and a receiver circuit 2420. The transmitter circuit 2410 may output a downlink signal DLS to the input sensor 200. The receiver circuit 2420 may receive an uplink signal ULS from the input sensor 200. The transmitter circuit 2410 may receive a signal from the controller 2300 and may modulate the signal into a signal that is able to be sensed by the input sensor 200, and the receiver circuit 2420 may modulate a signal from the input sensor 200 into a signal that is able to be processed by the controller 2300.

The pen electrode 2500 may be electrically connected to the communication module 2400. A portion of the pen electrode 2500 may be protruded from the housing 2100. In addition, the input device 2000 may further include a cover housing that covers the pen electrode 2500 exposed without being covered by the housing 2100. Alternatively, the pen electrode 2500 may be built into the housing 2100.

Figure 4A:
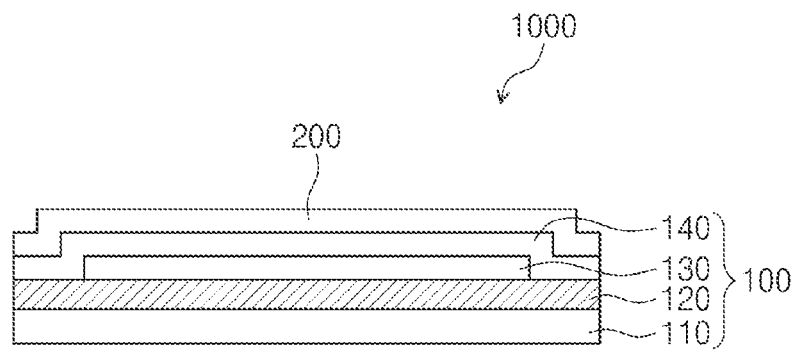
FIGS. 4A and 4B are cross-sectional views of an electronic device according to embodiments of the present disclosure.
Figure 4A:
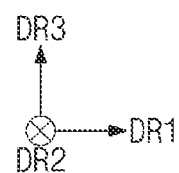

FIG. 4A is a cross-sectional view of the electronic device 1000 according to an embodiment of the present disclosure.

Referring to FIG. 4A, the electronic device 1000 may include the display panel 100 and the input sensor 200. The display panel 100 may include a base layer 110, a circuit layer 120, a light emitting element layer 130, and an encapsulation layer 140.

The base layer 110 may provide a base surface on which the circuit layer 120 is disposed. The base layer 110 may be, for example, a glass substrate, a metal substrate, or a polymer substrate. However, the base layer 110 is not limited thereto. For example, according to an embodiment, the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of, for example, an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In the present disclosure, the term "X-based resin", as used herein, refers to a resin that includes a functional group of X.

The circuit layer 120 may be disposed on the base layer 110. The circuit layer 120 may include, for example, an insulating layer, a semiconductor pattern, a conductive pattern, and a signal line. An insulating layer, a semiconductor layer, and a conductive layer may be formed on the base layer 110 by a coating or depositing process. Then, the insulating layer, the semiconductor layer, and the conductive layer may be selectively patterned through several photolithography processes. The semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from, for example, moisture, oxygen, and a foreign substance such as dust particles.

The input sensor 200 may be formed on the display panel 100 through successive processes. In this case, the input sensor 200 may be disposed directly on the display panel 100. In the following description, the expression that the input sensor 200 is disposed directly on the display panel 100 means that no intervening elements are present between the input sensor 200 and the display panel 100. That is, according to an embodiment, when the input sensor 200 is described as being disposed directly on the display panel 100, a separate adhesive member is not disposed between the input sensor 200 and the display panel 100, and the input sensor 200 and the display panel 100 directly contact each other. Alternatively, according to an embodiment, the input sensor 200 may be coupled with the display panel 100 by an adhesive layer. The adhesive layer may be a conventional adhesive.

Figure 4B:
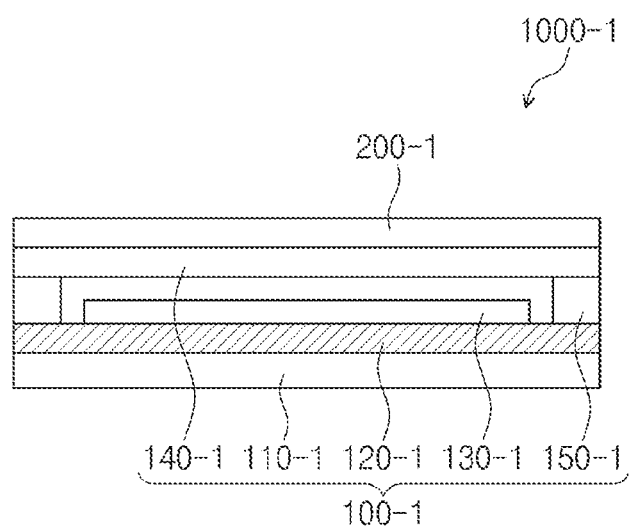
Figure 4B:
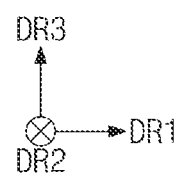

FIG. 4B is a cross-sectional view of the electronic device 1000-1 according to an embodiment of the present disclosure.

Referring to FIG. 4B, the electronic device 1000-1 may include a display panel 100-1 and an input sensor 200-1. The display panel 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be, for example, a glass substrate, a metal substrate, or a polymer substrate. However, each of the base substrate 110-1 and the encapsulation substrate 140-1 is not limited thereto.

The coupling member 150-1 may be disposed between the base substrate 110-1 and the encapsulation substrate 140-1. The encapsulation substrate 140-1 may be coupled with the base substrate 110-1 or the circuit layer 120-1 by the coupling member 150-1. The coupling member 150-1 may include an inorganic material or an organic material. For example, the inorganic material may include a frit seal, and the organic material may include a photocurable resin or a photoplastic resin. However, the material for the coupling member 150-1 is not limited thereto.

The input sensor 200-1 may be disposed directly on the encapsulation substrate 140-1. In the following descriptions, the expression that the input sensor 200-1 is disposed directly on the encapsulation substrate 140-1 means that no intervening elements are present between the input sensor 200-1 and the encapsulation substrate 140-1. That is, according to an embodiment, when the input sensor 200-1 is described as being disposed directly on the encapsulation substrate 140-1, a separate adhesive member is not disposed between the input sensor 200-1 and the encapsulation substrate 140-1. However, embodiments of the present disclosure are not limited thereto. For example, according to an embodiment, an adhesive layer may be further disposed between the input sensor 200-1 and the encapsulation substrate 140-1.

Figure 5:
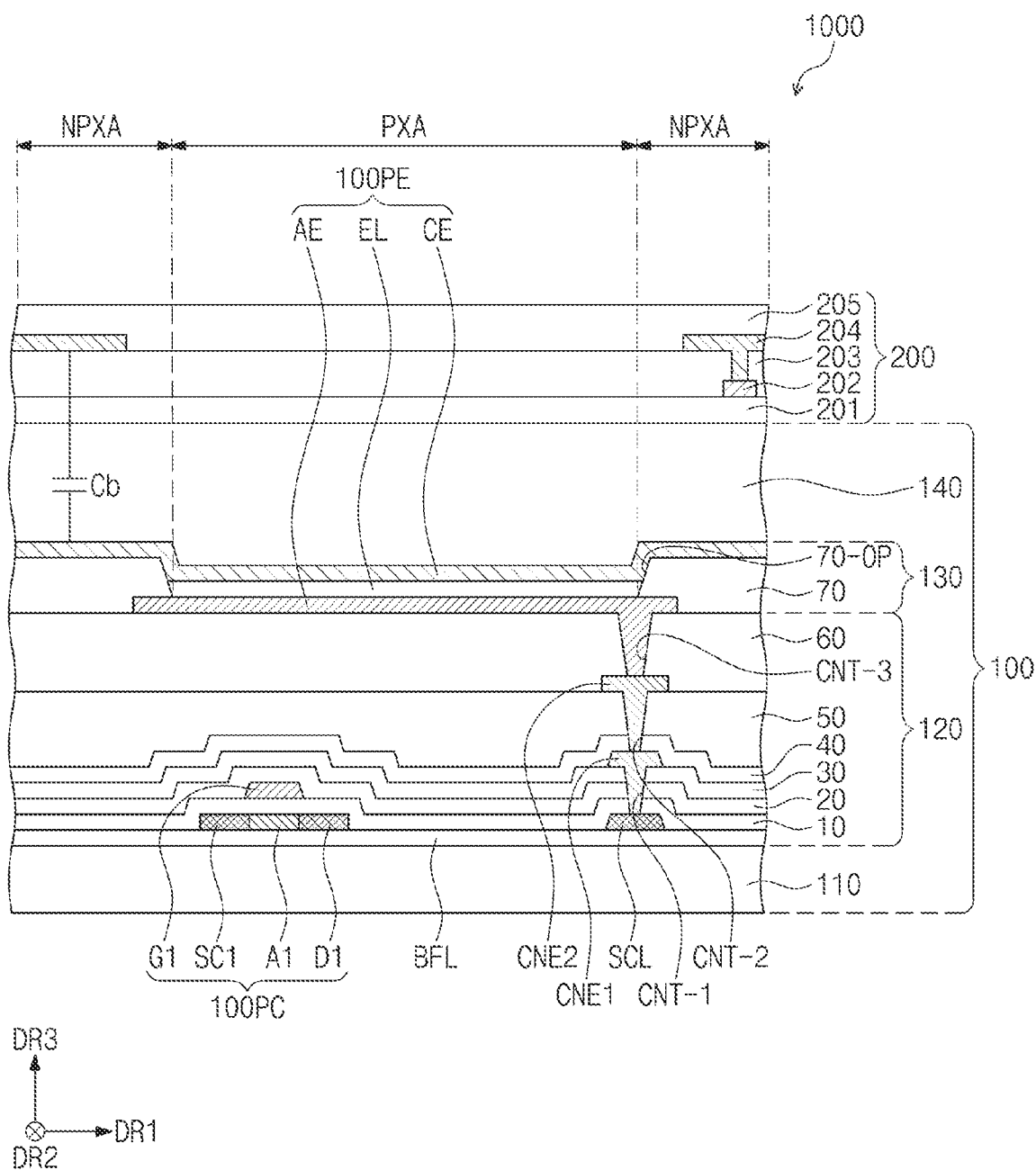
FIG. 5 is a cross-sectional view of an electronic device according to an embodiment of the present disclosure.

FIG. 5 is a cross-sectional view of the electronic device 1000 according to an embodiment of the present disclosure. In FIG. 5, the same reference numerals denote the same elements in FIG. 4A, and thus, detailed descriptions of the same elements will be omitted.

Referring to FIG. 5, at least one inorganic layer may be formed on an upper surface of the base layer 110. The inorganic layer may include at least one of, for example, aluminum oxide, titanium oxide, silicon oxide, silicon oxynitride, zirconium oxide, and hafnium oxide. The inorganic layer may be formed in multiple layers. The inorganic layers formed in multiple layers may form a barrier layer and/or a buffer layer. In an embodiment, the display panel DP may further include a buffer layer BFL.

The buffer layer BFL may increase an adhesion between the base layer 110 and the semiconductor pattern. The buffer layer BFL may include, for example, a silicon oxide layer and a silicon nitride layer, which may be alternately stacked with each other.

The semiconductor pattern may be disposed on the buffer layer BFL. The semiconductor pattern may include polysilicon. However, the semiconductor pattern is not limited thereto. The semiconductor pattern may include, for example, amorphous silicon, low-temperature polycrystalline silicon, or oxide semiconductor.

FIG. 5 shows only a portion of the semiconductor pattern. It is to be understood that the semiconductor pattern may be further disposed in other areas. The semiconductor pattern may be arranged with a specific rule over the pixels. The semiconductor pattern may have different electrical properties depending on whether it is doped at all, or whether it is doped with an N-type dopant or a P-type dopant. The semiconductor pattern may include a first region with high conductivity and a second region with low conductivity.

The first region may be doped with the N-type dopant or the P-type dopant. A P-type transistor may include a doped region doped with the P-type dopant, and an N-type transistor may include a doped region doped with the N-type dopant. The second region may be a non-doped region or may be doped at a concentration lower than the first region.

The first region may have a conductivity greater than that of the second region and may substantially serve as an electrode or signal line. The second region may substantially correspond to an active (or a channel) of a transistor. In other words, a portion of the semiconductor pattern may be the active of the transistor, another portion of the semiconductor pattern may be a source or a drain of the transistor, and the other portion of the semiconductor pattern may be a connection electrode or a connection signal line.

Each of the pixels may have an equivalent circuit that includes seven transistors, one capacitor, and the light emitting element, and the equivalent circuit of the pixels may be changed in various ways. FIG. 5 shows one transistor 100PC and the light emitting element 100PE included in the pixel.

The transistor 100PC may include a source SC1, an active A1, a drain D1, and a gate G1. The source SC1, the active A1, and the drain D1 may be formed from the semiconductor pattern. The source SC1 and the drain D1 may extend in opposite directions to each other from the active A1 in a cross-section. FIG. 5 shows a portion of the connection signal line SCL formed from the semiconductor pattern. In an embodiment, the connection signal line SCL may be electrically connected to the drain D1 of the transistor 100PC in a plane.

A first insulating layer 10 may be disposed on the buffer layer BFL. The first insulating layer 10 may commonly overlap the pixels and may cover the semiconductor pattern. The first insulating layer 10 may be an inorganic layer and/or an organic layer and may have a single-layer or multi-layer structure. The first insulating layer 10 may include at least one of, for example, aluminum oxide, titanium oxide, silicon oxide, silicon nitride, silicon oxynitride, zirconium oxide, and hafnium oxide. In an embodiment, the first insulating layer 10 may have a single-layer structure of a silicon oxide layer. Not only the first insulating layer 10, but also an insulating layer of the circuit layer 120 described below may be an inorganic layer and/or an organic layer and may have a single-layer or multi-layer structure. The inorganic layer may include at least one of the above-mentioned materials. However, the inorganic layer is not limited thereto.

The gate G1 of the transistor 100PC may be disposed on the first insulating layer 10. The gate G1 may be a portion of a metal pattern. The gate G1 may overlap the active A1. The gate G1 may be used as a mask in a process of doping the semiconductor pattern.

A second insulating layer 20 may be disposed on the first insulating layer 10 and may cover the gate G1. The second insulating layer 20 may commonly overlap the pixels. The second insulating layer 20 may be an inorganic layer and/or an organic layer and may have a single-layer or multi-layer structure. The second insulating layer 20 may include at least one of, for example, silicon oxide, silicon nitride, and silicon oxynitride. In an embodiment, the second insulating layer 20 may have a multi-layer structure of a silicon oxide layer and a silicon nitride layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL via a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinafter, the organic light emitting element will be described as the light emitting element 100PE. However, the organic light emitting element is not limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 via a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The active area 1000A (refer to FIG. 1) may include a light emitting area PXA and a non-light-emitting area NPXA adjacent to the light emitting area PXA. The non-light-emitting area NPXA may surround the light emitting area PXA. In an embodiment, the light emitting area PXA may correspond to the portion of the first electrode AE exposed through the opening 70-OP.

The light emitting layer EL may be disposed on the first electrode AE. The light emitting layer EL may be disposed in an area corresponding to the opening 70-OP. That is, the light emitting layer EL may be formed in each of the pixels after being divided into plural portions. In the case where the light emitting layer EL is formed in each of the pixels after being divided into plural portions, each of the light emitting layers EL may emit a light having at least one of blue, red, and green colors. However, embodiments of the present disclosure are not limited thereto. The light emitting layer EL may be commonly provided in the pixels. In this case, the light emitting layer EL may provide a blue light or a white light.

The second electrode CE may be disposed on the light emitting layer EL. The second electrode CE may have an integral shape and may be commonly disposed over the pixels.

According to embodiments, a hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels using an open mask.

The encapsulation layer 140 may be disposed on the light emitting element layer 130. The encapsulation layer 140 may include, for example, an inorganic layer, an organic layer, and an inorganic layer, which are sequentially stacked. However, layers of the encapsulation layer 140 are not limited thereto.

The inorganic layers may protect the light emitting element layer 130 from, for example, moisture and oxygen, and the organic layer may protect the light emitting element layer 130 from a foreign substance such as, for example, dust particles. Each of the inorganic layers may include, for example, a silicon nitride layer, a silicon oxynitride layer, a silicon oxide layer, a titanium oxide layer, or an aluminum oxide layer. The organic layer may include an acrylic-based organic layer. However, the organic layer is not limited thereto.

The input sensor 200 may be formed on the display panel 100 through successive processes. That is, the input sensor 200 may be disposed directly on the display panel 100. In the present disclosure, the expression "the input sensor 200 is disposed directly on the display panel 100" means that no intervening elements are present between the input sensor 200 and the display panel 100. That is, according to an embodiment, when the input sensor 200 is described as being disposed directly on the display panel 100, a separate adhesive member is not disposed between the input sensor 200 and the display panel 100, and the input sensor 200 and the display panel 100 directly contact each other. Alternatively, according to an embodiment, the input sensor 200 may be coupled with the display panel 100 by the adhesive layer. The adhesive layer may be a conventional adhesive.

The input sensor 200 may include a base insulating layer 201, a first conductive layer 202, a sensing insulating layer 203, a second conductive layer 204, and a cover insulating layer 205.

The base insulating layer 201 may be an inorganic layer that includes at least one of, for example, silicon nitride, silicon oxynitride, and silicon oxide. Alternatively, the base insulating layer 201 may be an organic layer that includes, for example, an epoxy-based resin, an acrylic-based resin, or an imide-based resin. The base insulating layer 201 may have a single-layer structure or a multi-layer structure of layers stacked on one another in the third direction DR3.

Each of the first conductive layer 202 and the second conductive layer 204 may have a single-layer structure or a multi-layer structure of layers stacked in the third direction DR3.

The conductive layer having the single-layer structure may include a metal layer or a transparent conductive layer. The metal layer may include, for example, molybdenum, silver, titanium, copper, aluminum, or alloys thereof. The transparent conductive layer may include a transparent conductive oxide, such as, for example, indium tin oxide (ITO), indium zinc oxide (IZO), zinc oxide (ZnO), indium zinc tin oxide (IZTO), etc. In addition, the transparent conductive layer may include a conductive polymer such as, for example, PEDOT, a metal nanowire, a graphene, etc.

The conductive layer having the multi-layer structure may include metal layers. The metal layers may have, for example, a three-layer structure of titanium/aluminum/titanium. The conductive layer having the multi-layer structure may include at least one metal layer and at least one transparent conductive layer.

At least one of the sensing insulating layer 203 and the cover insulating layer 205 may include an inorganic layer. The inorganic layer may include at least one of, for example, aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of, for example, an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

A parasitic capacitance Cb may be formed between the input sensor 200 and the second electrode CE. When a distance between the input sensor 200 and the second electrode CE decreases, the parasitic capacitance Cb may increase. As the parasitic capacitance Cb increases, a ratio of a variation in the capacitance to a reference value may decrease. The variation in the capacitance may mean a difference in capacitance between a capacitance before an input by the input device, e.g., the input device 2000 (refer to FIG. 3) or the user's body 3000 (refer to FIG. 3), and a capacitance after the input by the input device, e.g., the input device 2000 (refer to FIG. 3) or the user's body 3000 (refer to FIG. 3).

The sensor controller 200C (refer to FIG. 3) that processes the signal sensed by the input sensor 200 may perform a leveling operation to remove a value corresponding to the parasitic capacitance Cb from the sensed signal. The ratio of the variation in the capacitance to the reference value may increase by the leveling operation, and thus, a sensing sensitivity may be increased.

Figure 6:
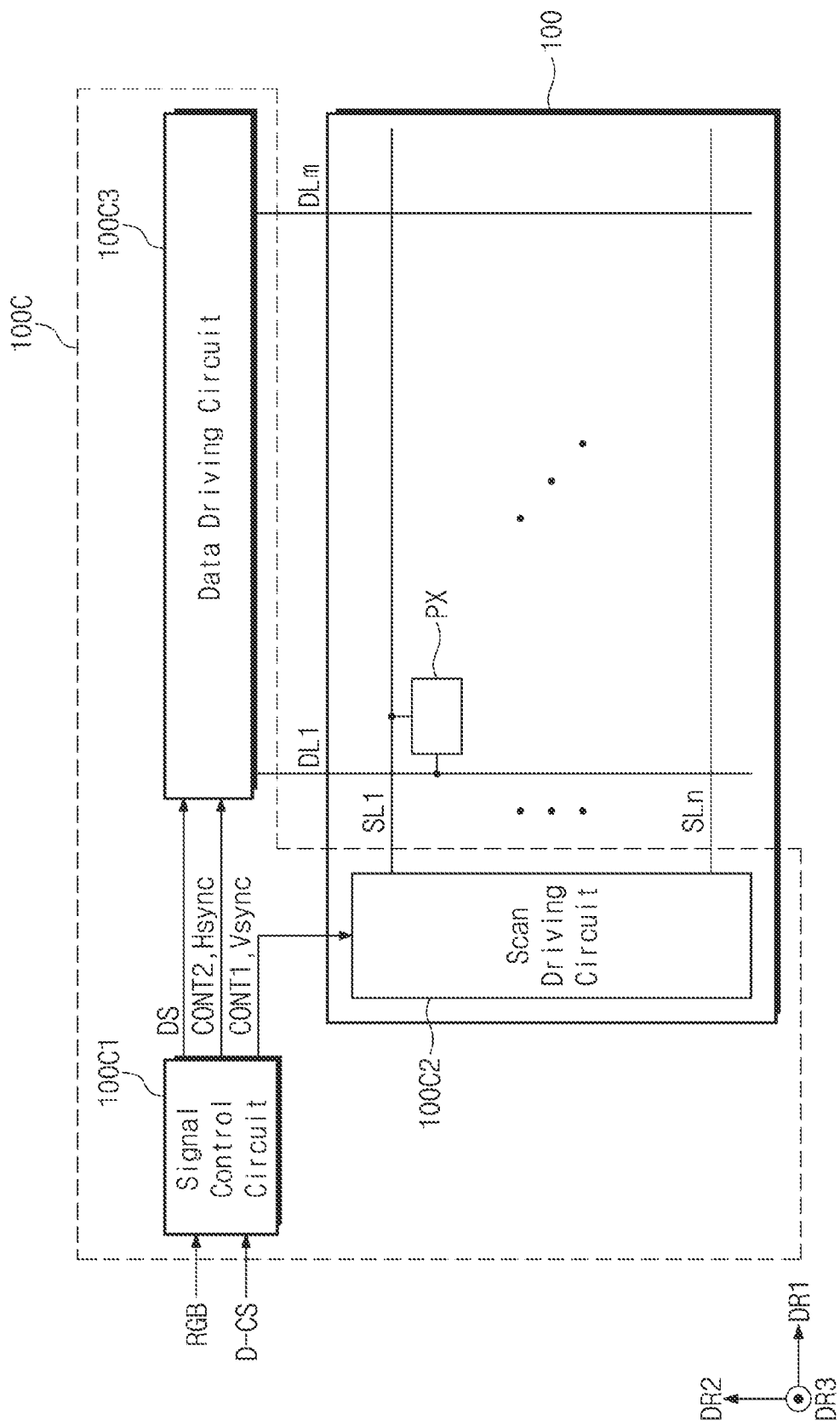
FIG. 6 is a block diagram of a display panel and a display controller according to an embodiment of the present disclosure.

FIG. 6 is a block diagram of the display panel 100 and the display controller 100C according to an embodiment of the present disclosure.

Referring to FIG. 6, the display panel 100 may include a plurality of scan lines SL1 to SLn, a plurality of data lines DL1 to DLm, and a plurality of pixels PX, where each of n and m is a positive integer. Each of the pixels PX may be connected to a corresponding data line of the data lines DL1 to DLm and a corresponding scan line of the scan lines SL1 to SLn. According to an embodiment, the display panel 100 may further include light emission control lines, and the display controller 100C may further include a light emission driving circuit applying control signals to the light emission control lines.

The display controller 100C may include a signal control circuit 100C1, a scan driving circuit 100C2, and a data driving circuit 100C3.

The signal control circuit 100C1 may receive the image data RGB and the control signal D-CS from the main controller 1000C (refer to FIG. 3). The control signal D-CS may include a variety of signals. As an example, the control signal D-CS may include the input vertical synchronization signal, the input horizontal synchronization signal, the main clock, and the data enable signal.

The signal control circuit 100C1 may generate a first control signal CONT1 and the vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and the horizontal synchronization signal Hsync based on the control signal D-CS and may output the second control signal CONT2 and the horizontal synchronization signal Hsync to the data driving circuit 100C3. The horizontal synchronization signal Hsync may be included in the second control signal CONT2.

In addition, the signal control circuit 100C1 may output a data signal DS obtained by processing the image data RGB according to an operational condition of the display panel 100 to the data driving circuit 100C3. The first control signal CONT1 and the second control signal CONT2 may be signals utilized for an operation of the scan driving circuit 100C2 and the data driving circuit 100C3, and are not particularly limited.

The scan driving circuit 100C2 may drive the scan lines SL1 to SLn in response to the first control signal CONT1 and the vertical synchronization signal Vsync. According to an embodiment, the scan driving circuit 100C2 may be formed through the same process as the circuit layer 120 (refer to FIG. 5) of the display panel 100. However, embodiments of the present disclosure are not limited thereto. As an example, the scan driving circuit 100C2 may be directly mounted on a predetermined area of the display panel 100 after being implemented in an integrated circuit (IC) or may be electrically connected to the display panel 100 after being mounted on a separate printed circuit board in a chip-on-film (COF).

The data driving circuit 100C3 may output grayscale voltages to drive the data lines DL1 to DLm in response to the second control signal CONT2, the horizontal synchronization signal Hsync, and the data signal DS from the signal control circuit 100C1. The data driving circuit 100C3 may be directly mounted on a predetermined area of the display panel 100 after being implemented in an integrated circuit (IC) or may be electrically connected to the display panel 100 after being mounted on a separate printed circuit board in a chip-on-film (COF). However, embodiments of the present disclosure are not limited thereto. For example, the data driving circuit 100C3 may be formed through the same process as the circuit layer 120 (refer to FIG. 5) of the display panel 100.

Figure 7A:
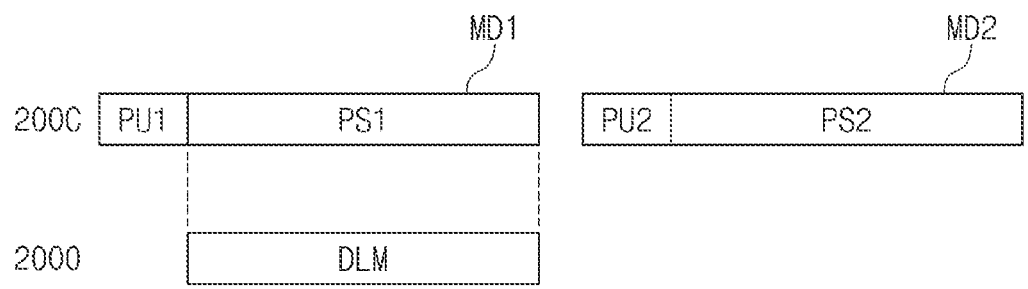
FIGS. 7A and 7B are conceptual views of operations in first and second modes according to an embodiment of the present disclosure.
Figure 7B:
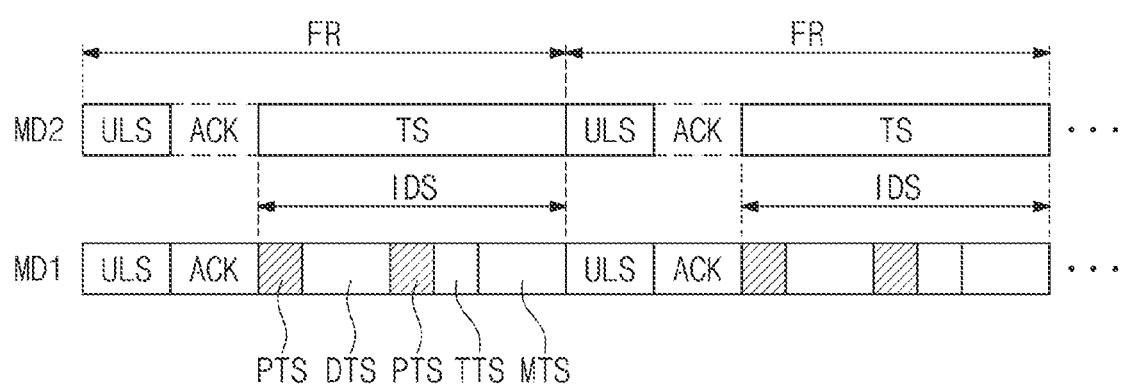

FIGS. 7A and 7B are conceptual views of operations in the first and second modes according to an embodiment of the present disclosure.

Referring to FIGS. 3 and 7A, the sensor controller 200C may be operated in the first mode MD1 in which the first input generated by the input device 2000 is sensed or the second mode MD2 in which the second input generated by the user's body 3000 is sensed.

The first mode MD1 may include a first period PU1 and a second period PS1. The second period PS1 may proceed after the first period PU1. During the first period PU1, the uplink signal ULS or an opposed-phase signal having a phase opposite to that of the uplink signal ULS may be transmitted to the input sensor 200. The opposed-phase signal will be described in detail below. During the second period PS1, the downlink signal DLS provided from the input device 2000 may be received via the input sensor 200. The input sensor 200 may sense the first input by the input device 2000 based on the downlink signal DLS.

The input device 2000 may apply the downlink signal DLS to the sensor controller 200C during a downlink operation period DLM.

The sensor controller 200C may be operated in the second mode MD2 after the first mode MD1 is finished. The first mode MD1 and the second mode MD2 may be alternately repeated.

The second mode MD2 may include a first period PU2 and a second period PS2. The second period PS2 may proceed after the first period PU2. During the first period PU2, the uplink signal ULS or the opposed-phase signal may be transmitted to the input sensor 200. The second period PS2 may be a period during which the second input generated by the user's body 3000 is sensed.

The input device 2000 may apply a response signal with respect to the uplink signal ULS to the input sensor 200. The sensor controller 200C may be operated in the second period PS1 of the first mode MD1 when receiving the response signal sensed by the input sensor 200 in the first periods PU1 and PU2. The sensor controller 200C may be operated in the second period PS2 of the second mode MD2 when the sensor controller 200C does not receive the response signal from the input device 2000 in the first period PU2. Accordingly, the input sensor 200 may periodically monitor whether the input device 2000 is sensed and may efficiently sense the first input generated by the input device 2000. However, this is merely an example, and the operation of the sensor controller 200C is not limited thereto.

FIG. 7B shows an operation process of the input sensor 200 operated in the first mode MD1 and the second mode MD2. The operation process described below may be repeated every frame FR.

Referring to FIG. 7B, the sensor controller 200C (refer to FIG. 3) may apply the uplink signal ULS to first sensing electrodes 210 (refer to FIG. 8) and second sensing electrodes 220 (refer to FIG. 8) in the second mode MD2 and the first mode MD1.

Responsive to the uplink signal ULS, the first sensing electrodes 210 and the second sensing electrodes 220 may sense an approach of the input device 2000 (refer to FIG. 3). In a case where the input sensor 200 receives a downlink signal ACK from the input device 2000 in response to the uplink signal ULS, the sensor controller 200C may control the input sensor 200 to operate in the first mode MD1, and the input sensor 200 may be operated in an input device sensing period IDS in which the input by the input device 2000 is sensed. In a case where the input sensor 200 does not receive the downlink signal ACK, the input sensor 200 may be operated in a touch sensing period TS to sense the user's touch in the second mode MD2.

According to an embodiment, the input device sensing period IDS may include a position signal detection period PTS, a data signal detection period DTS, an input angle detection period TTS, and a touch signal detection period MTS.

The position signal detection period PTS may be provided in plural. The sensor controller 200C may continuously detect an input position of the input device 2000 in the position signal detection period PTS.

Various information applied from the input device 2000 may be detected in the data signal detection period DTS. As an example, the sensor controller 200C may detect a level of pressure applied to the first and second sensing electrodes of the input sensor by the input device 2000 in the data signal detection period DTS. The data signal detection period DTS may be provide in plural.

The input angle detection period TTS may be a period in which a tilt degree of the input device 2000 is detected when the input by input device 2000 is provided.

The touch signal detection period MTS may correspond to a period in which an unintended touch input is detected when the unintended touch input is applied in the first mode MD1. The detected touch input may be removed.

Figure 8:
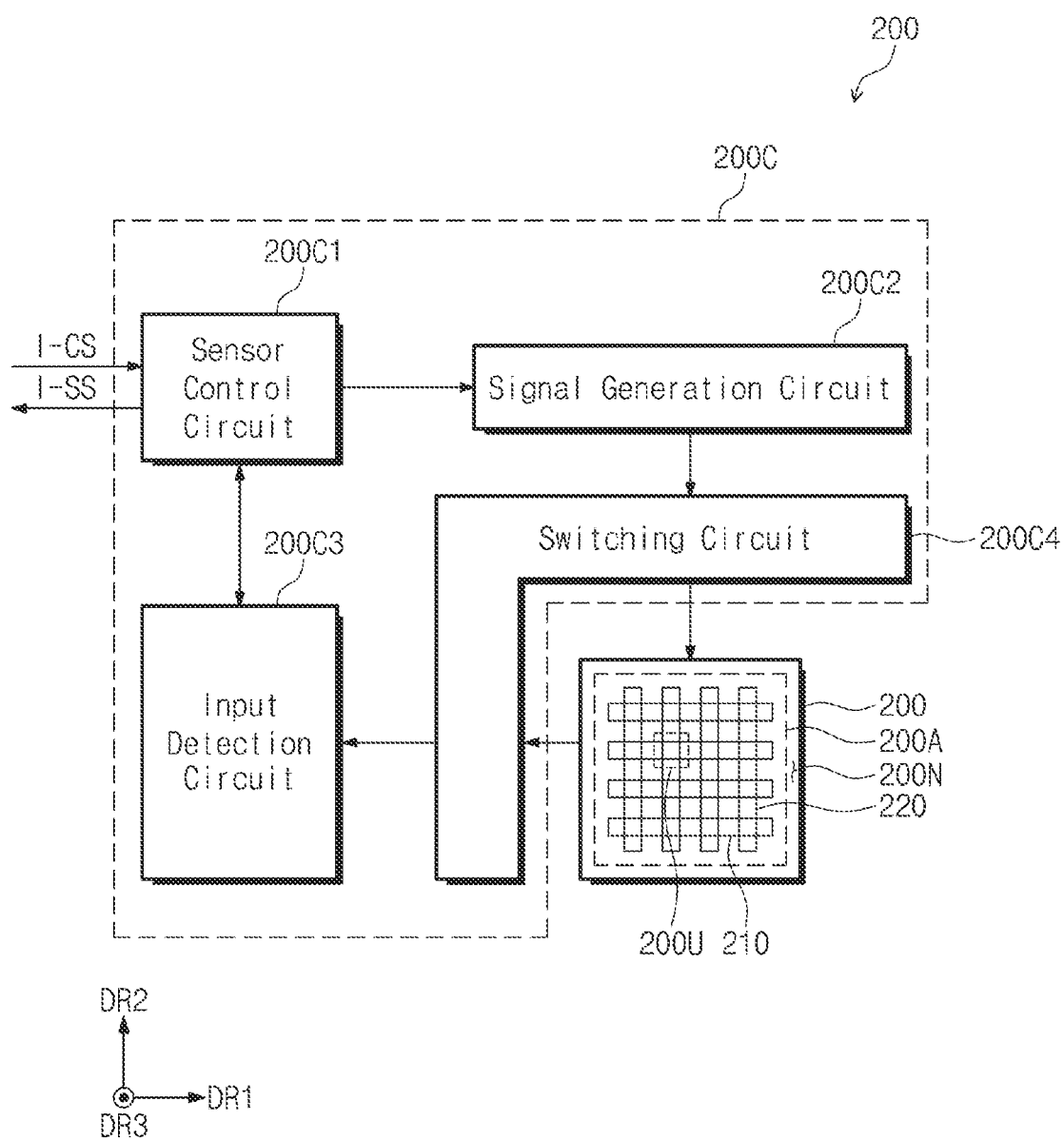
FIG. 8 is a block diagram of an input sensor and a sensor controller according to an embodiment of the present disclosure.

FIG. 8 is a block diagram of the input sensor 200 and the sensor controller 200C according to an embodiment of the present disclosure.

Referring to FIG. 8, the input sensor 200 may include an active area 200A and a peripheral area 200N defined therein.

The active area 200A may be activated in response to electrical signals. As an example, the active area 200A may be an area in which the input is sensed. The active area 200A may correspond to the active area 1000A (refer to FIG. 1) of the electronic device 1000 (refer to FIG. 1). The peripheral area 200N may surround the active area 200A. The peripheral area 200N may correspond to the peripheral area 1000NA (refer to FIG. 1) of the electronic device 1000 (refer to FIG. 1).

The input sensor 200 may include the first sensing electrodes 210 and the second sensing electrodes 220. The first sensing electrodes 210 may extend in the first direction DR1, and the first sensing electrodes 210 may be spaced apart from each other in the second direction DR2. The second sensing electrodes 220 may extend in the second direction DR2, and the second sensing electrodes 220 may be spaced apart from each other in the first direction DR1.

The second sensing electrodes 220 may be insulated from the first sensing electrodes 210 while crossing the first sensing electrodes 210. Each of the first sensing electrodes 210 and each of the second sensing electrodes 220 may have a bar shape or a stripe shape. The first sensing electrodes 210 and the second sensing electrodes 220 having the bar shape or the stripe shape may increase sensing characteristics with respect to continuous linear input. However, the shape of the first sensing electrodes 210 and the shape of the second sensing electrodes 220 is not limited thereto.

The sensor controller 200C may receive the control signal I-CS from the main controller 1000C (refer to FIG. 3) and may apply the coordinate signal I-SS to the main controller 1000C (refer to FIG. 3).

The sensor controller 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip, or some of the sensor control circuit 200C1, the signal generation circuit 200C2, and the input detection circuit 200C3 may be implemented in a different chip.

The sensor control circuit 200C1 may control an operation of the signal generation circuit 200C2 and the switching circuit 200C4. The sensor control circuit 200C1 may calculate coordinates of the external input from a driving signal provided from the input detection circuit 200C3 or may analyze information transmitted by the input device 2000 (refer to FIG. 3) from a modulated signal applied thereto from the input detection circuit 200C3. The sensor control circuit 200C1 may divide the active area 200A of the input sensor 200 into a plurality of areas. The plurality of areas may be defined based on an input position or coordinates to which the input by the input device 2000 (refer to FIG. 3) is provided.

The sensor control circuit 200C1 may provide the uplink signal ULS (refer to FIG. 3) to some areas of the plurality of areas and may provide the opposed-phase signal having the phase opposite to that of the uplink signal ULS (refer to FIG. 3) to the other areas of the plurality areas. In the present disclosure, the uplink signal ULS may be referred to as a first signal, and the opposed-phase signal may be referred to as a second signal.

The signal generation circuit 200C2 may apply an output signal (or a driving signal), e.g., a TX signal, to the input sensor 200. The signal generation circuit 200C2 may output the output signal corresponding to an operational mode to input sensor 200.

The input detection circuit 200C3 may convert an analog signal (e.g., an RX signal (or a sensing signal)) provided from the input sensor 200 to a digital signal. The input detection circuit 200C3 may amplify the received analog signal and may filter the amplified signal. The input detection circuit 200C3 may convert the filtered signal to the digital signal.

The switching circuit 200C4 may selectively control an electrical connection relationship between the input sensor 200 and the signal generation circuit 200C2 and/or the input detection circuit 200C3 in response to the control by the sensor control circuit 200C1. Responsive to the control by the sensor control circuit 200C1, the switching circuit 200C4 may connect one group of the first sensing electrodes 210 and the second sensing electrodes 220 to the signal generation circuit 200C2 or may connect each of the first sensing electrodes 210 and the second sensing electrodes 220 to the signal generation circuit 200C2. According to an embodiment, the switching circuit 200C4 may connect one group of the first sensing electrodes 210 and the second sensing electrodes 220 or both the first sensing electrodes 210 and the second sensing electrodes 220 to the input detection circuit 200C3.

Figure 9A:
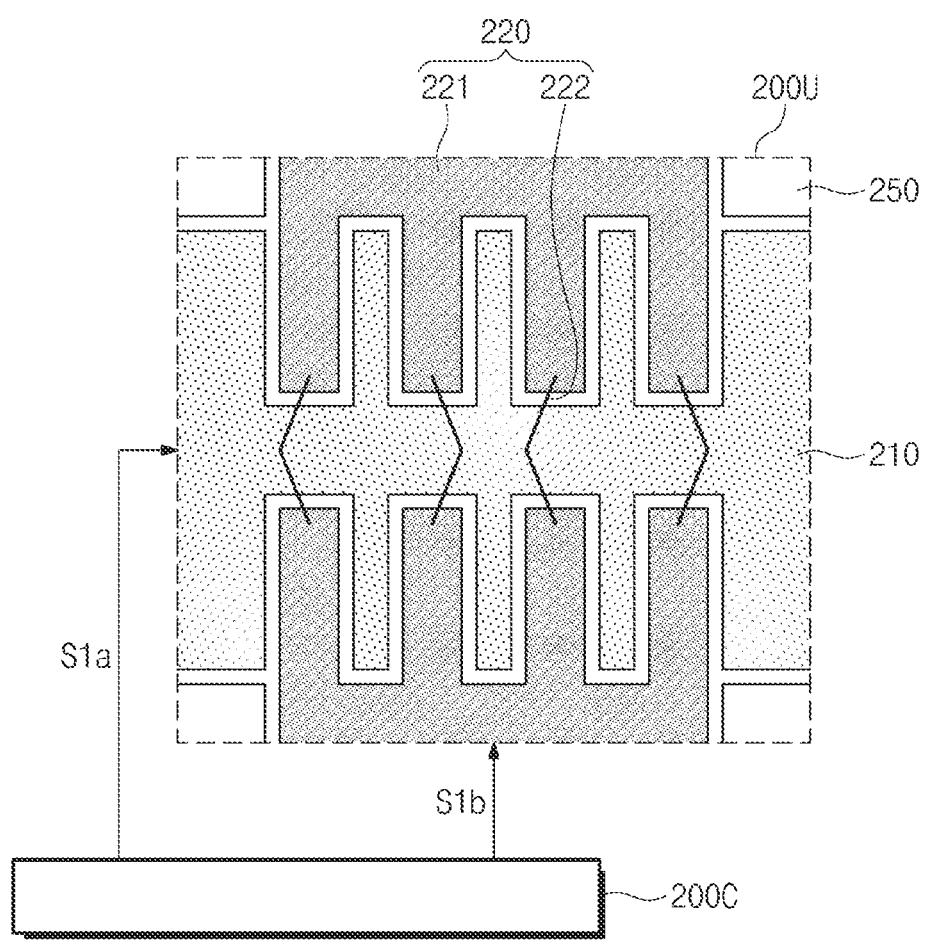
FIGS. 9A and 9B are views of an input sensor operated in a first mode according to an embodiment of the present disclosure.
Figure 9B:
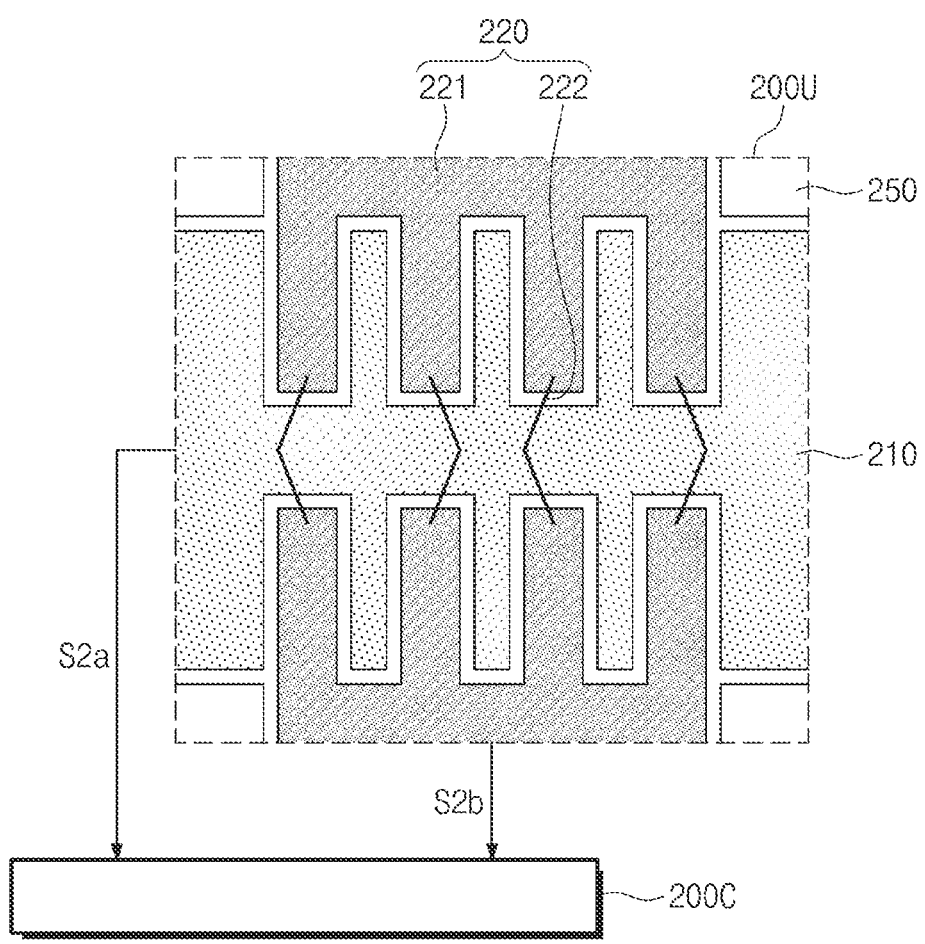

FIGS. 9A and 9B are views of the input sensor operated in the first mode according to an embodiment of the present disclosure.

Referring to FIGS. 8, 9A, and 9B, a portion of one first sensing electrode 210 and a portion of one second sensing electrode 220 may be defined as one sensing unit 200U. FIGS. 9A and 9B are enlarged views of one sensing unit 200U.

The second sensing electrode 220 may include crossing patterns 221 and bridge patterns 222 electrically connected to the crossing patterns 221. The crossing patterns 221 may be spaced apart from each other with the first sensing electrode 210 interposed therebetween. The bridge patterns 222 may overlap the first sensing electrode 210, and the bridge patterns 222 may be insulated from the first sensing electrode 210 while crossing the first sensing electrode 210.

The crossing patterns 221 and the first sensing electrode 210 may be disposed on the same layer as each other, and the bridge patterns 222 may be disposed on a layer different from a layer on which the crossing patterns 221 and the first sensing electrode 210 are disposed. As an example, the crossing patterns 221 and the first sensing electrode 210 may be included in the second conductive layer 204 (refer to FIG. 5), and the bridge patterns 222 may be included in the first conductive layer 202 (refer to FIG. 5). This structure may be referred to as a bottom bridge structure. However, embodiments of the present disclosure are not limited thereto. For example, according to an embodiment, the crossing patterns 221 and the first sensing electrode 210 may be include in the first conductive layer 202 (refer to FIG. 5), and the bridge patterns 222 may be included in the second conductive layer 204 (refer to FIG. 5). This structure may be referred to as a top bridge structure.

In addition, the input sensor 200 may further include a dummy pattern 250 disposed in an area in which the crossing patterns 221 and the first sensing electrode 210 are not disposed. The dummy pattern 250 may prevent the first sensing electrode 210 and the second sensing electrode 220 from being visible from outside of the electronic device 1000 (e.g., from being visible to the user), and the dummy pattern 250 may be electrically floated.

Each of the crossing patterns 221, the first sensing electrode 210, and the dummy pattern 250 may have a mesh structure. In this case, an opening may be defined through each of the crossing patterns 221, the first sensing electrode 210, and the dummy pattern 250. However, embodiments of the present disclosure are not limited thereto. For example, according to an embodiment, each of the crossing patterns 221, the first sensing electrode 210, and the dummy pattern 250 may be provided as a single transparent electrode.

The electronic device 1000 (refer to FIG. 1) and the input device 2000 (refer to FIG. 1) may transmit and receive data to and from each other in the first mode MD1 (refer to FIG. 7A). The operation shown in FIG. 9A may be an operation in which the uplink signal is provided to the input device 2000 (refer to FIG. 1) from the electronic device 1000 (refer to FIG. 1).

Referring to FIG. 9A, the first sensing electrode 210 and the second sensing electrode 220 may be used as transmission electrodes to provide uplink signals S1a and S1b from the sensor controller 200C to the input device 2000 (refer to FIG. 1), respectively. However, embodiments of the present disclosure are not limited thereto. As an example, the first sensing electrode 210 or the second sensing electrode 220 may be used as the transmission electrode.

Referring to FIG. 9B, the first sensing electrode 210 and the second sensing electrode 220 may be used as reception electrodes to transmit sensing signals S2a and S2b induced from the input device 2000 (refer to FIG. 1) to the sensor controller 200C, respectively. The sensor controller 200C may receive a first sensing signal S2a from the first sensing electrode 210 and may receive a second sensing signal S2b from the second sensing electrode 220.

Figure 10:
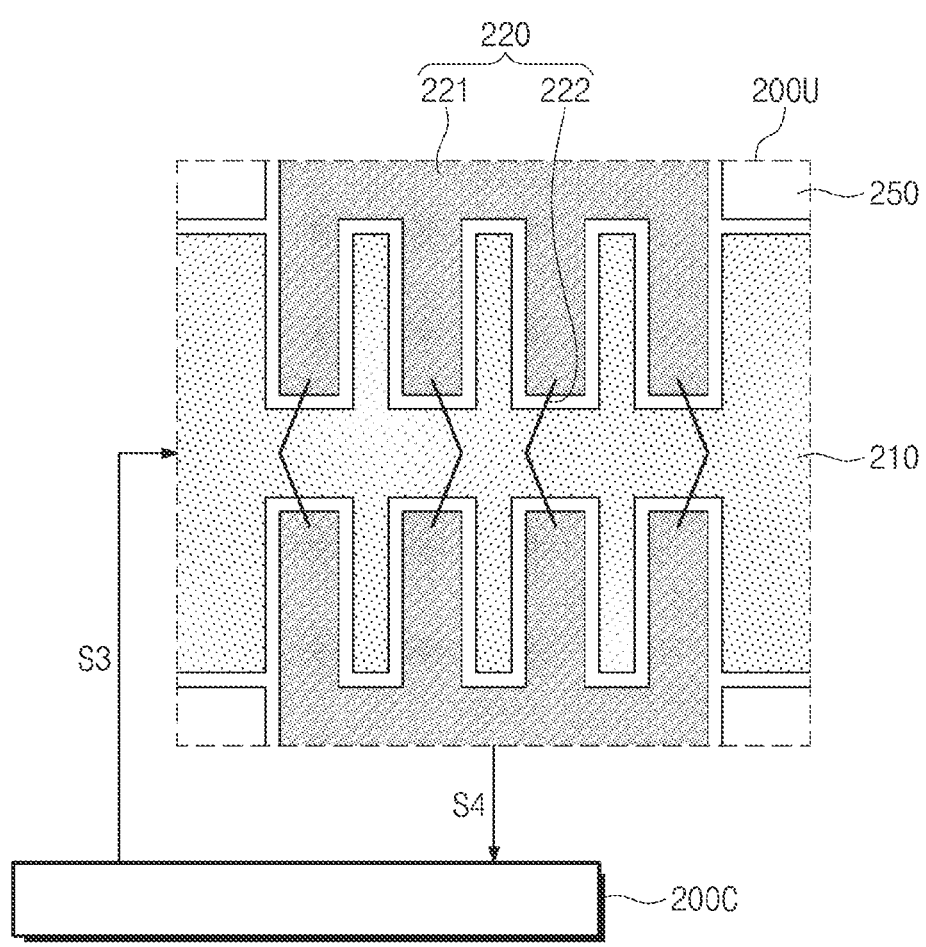
FIG. 10 is a view of an input sensor operated in a second mode according to an embodiment of the present disclosure.

FIG. 10 is a view of the input sensor operated in the second mode according to an embodiment of the present disclosure.

Referring to FIGS. 8 and 10, the sensor controller 200C may sense the second input generated by the user's body 3000 (refer to FIG. 3) in the second mode MD2 (refer to FIG. 7A). The sensor controller 200C may sense a variation in mutual capacitance between the first sensing electrode 210 and the second sensing electrode 220 and may sense the external input in the second mode MD2 (refer to FIG. 7A).

The sensor controller 200C may provide an output signal S3 to the first sensing electrode 210, and the sensor controller 200C may receive a sensing signal S4 from the second sensing electrode 220. That is, the first sensing electrode 210 may serve as a transmission electrode in the second mode MD2 (refer to FIG. 7A), and the second sensing electrode 220 may serve as a reception electrode in the second mode MD2 (refer to FIG. 7A). However, embodiments of the present disclosure are not limited thereto. As an example, the first sensing electrode 210 may serve as the reception electrode, and the second sensing electrode 220 may serve as the transmission electrode.

Figure 11A:
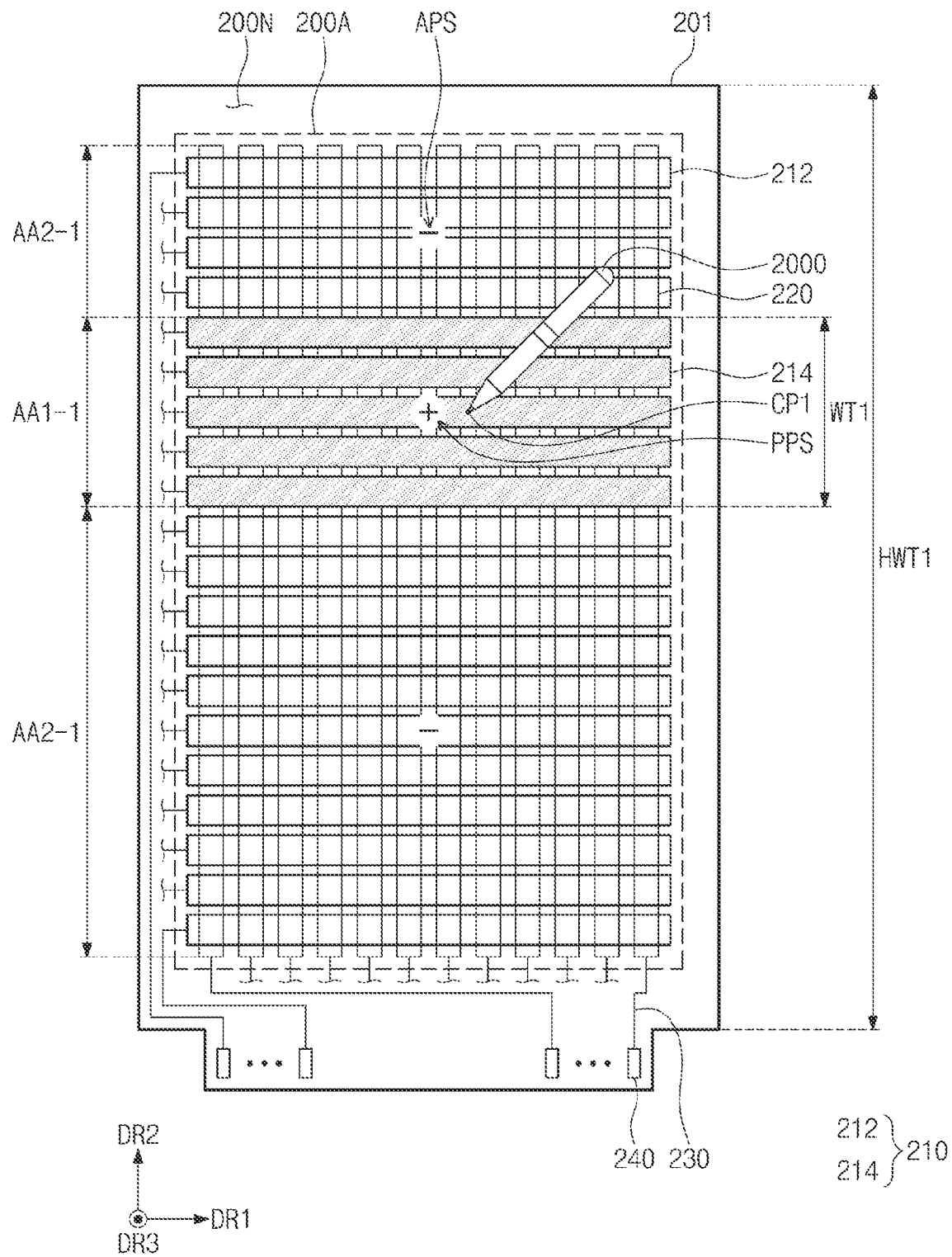
FIGS. 11A and 11B are plan views of an input sensor operated in a first mode according to an embodiment of the present disclosure.
Figure 11B:
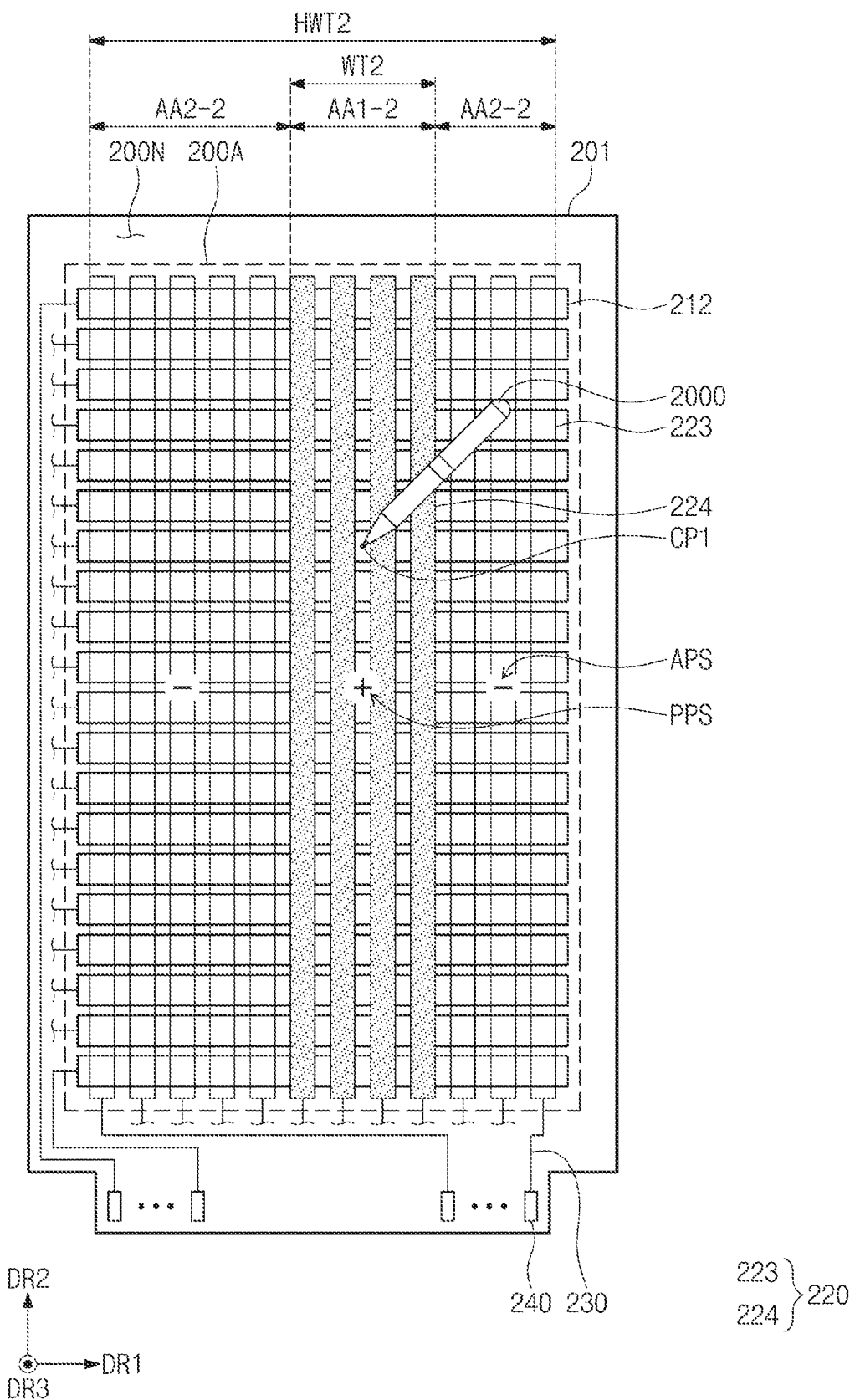
Figure 12:
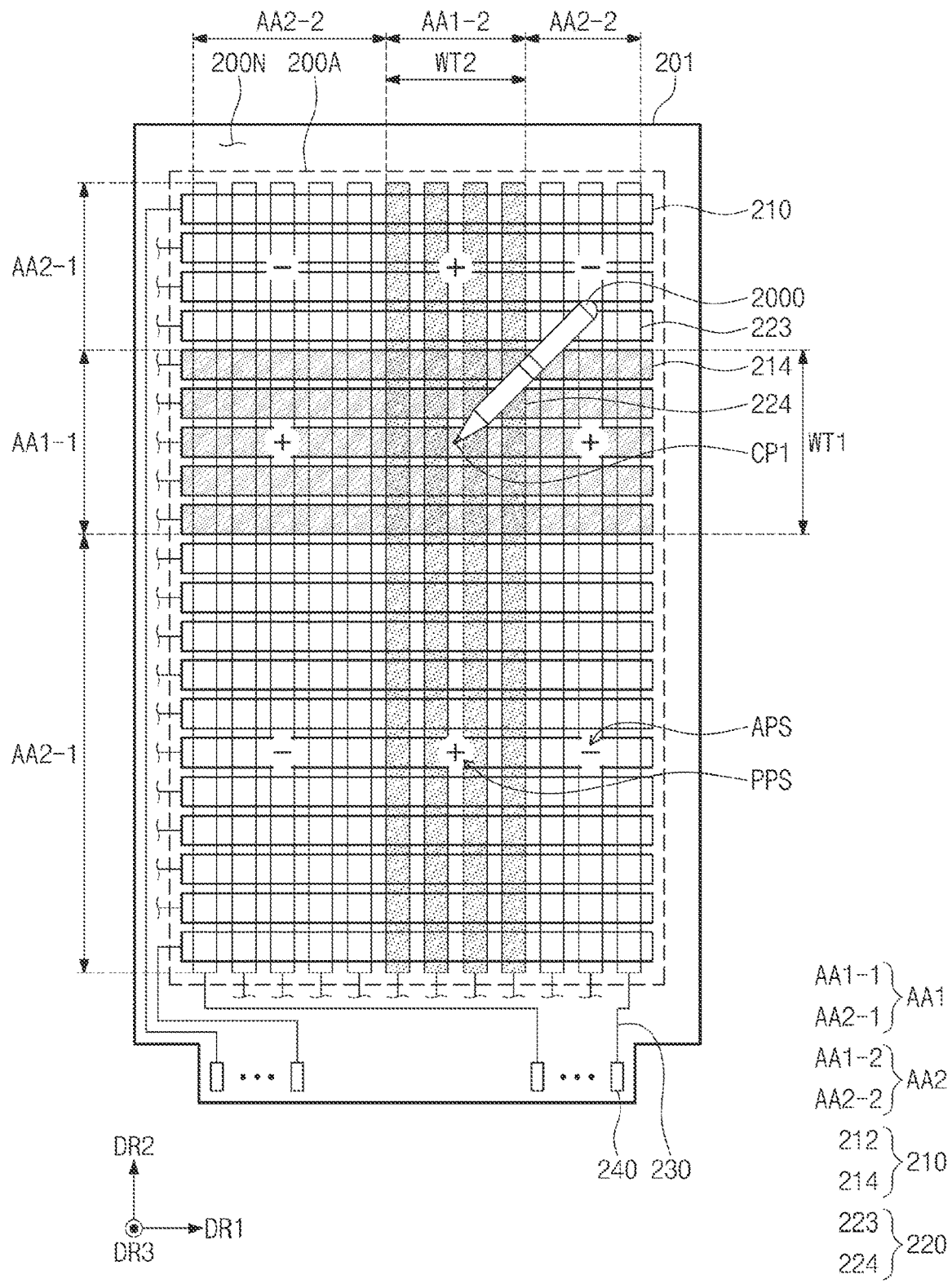
FIG. 12 is a plan view of an input sensor operated in a first mode according to an embodiment of the present disclosure.
Figure 13:
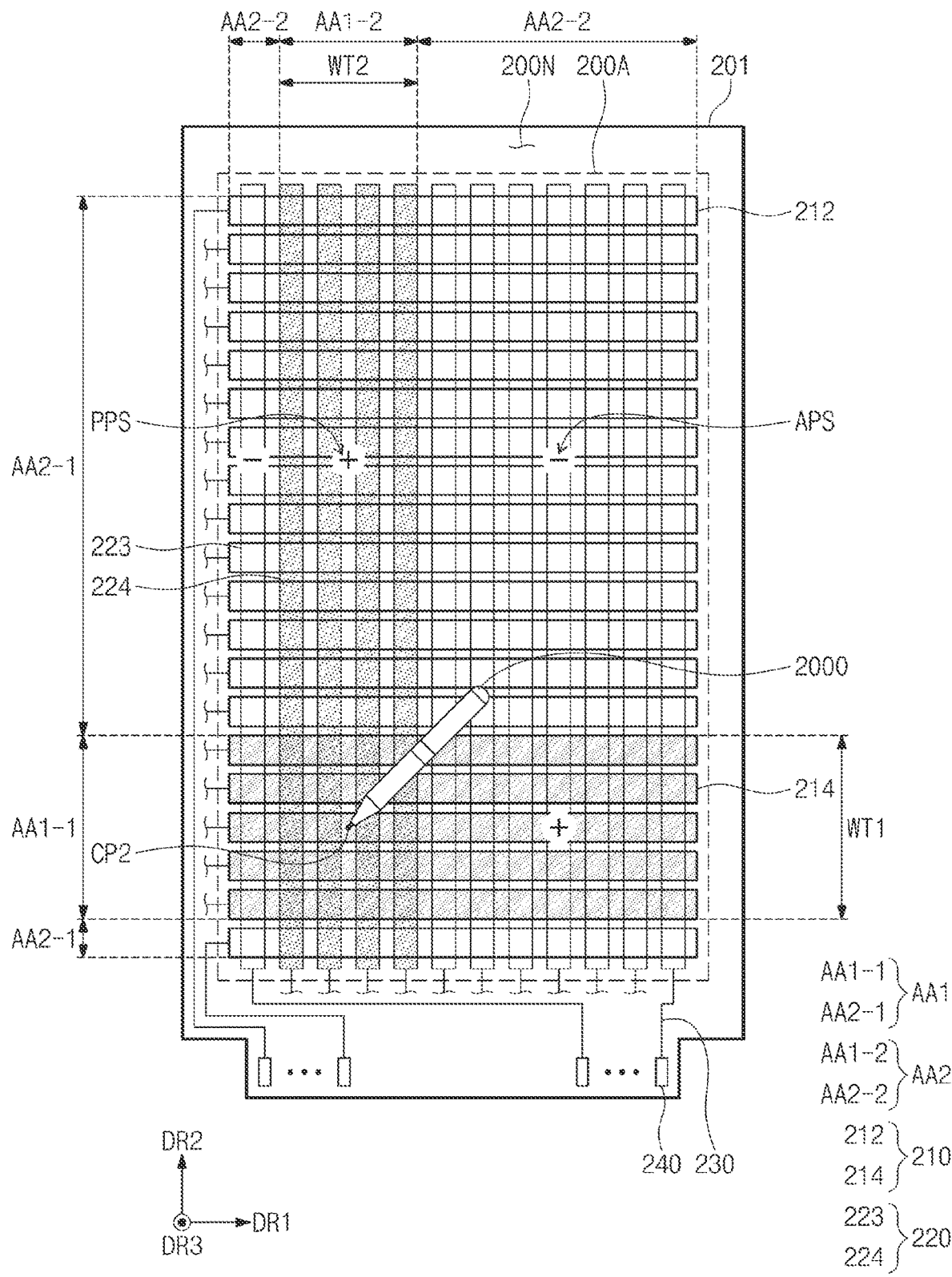
FIG. 13 is a plan view of an input sensor operated in a first mode according to an embodiment of the present disclosure.

FIGS. 11A and 11B are plan views of an input sensor operated in a first mode according to an embodiment of the present disclosure. FIG. 12 is a plan view of an input sensor operated in a first mode according to an embodiment of the present disclosure. FIG. 13 is a plan view of an input sensor operated in a first mode according to an embodiment of the present disclosure. The input sensor 200 may be operated to sense the input device 2000 in the first mode.

FIG. 11A is a view showing only a first sensor part of the input sensor in the first mode. FIG. 11B is a view showing only a second sensor part of the input sensor in the first mode. FIG. 12 is a view showing the input sensor in first mode. FIG. 12 shows both the first sensor part of FIG. 11A and the second sensor part of FIG. 11B.

The input sensor 200 may include a base insulating layer 201, a plurality of first sensing electrodes 210, a plurality of second sensing electrodes 220, a plurality of lines 230, and a plurality of pads 240.

Referring to FIGS. 11A, 11B, 12 and 13, the first sensing electrodes 210 and the second sensing electrodes 220 may be disposed in an active area 200A. The lines 230 and the pads 240 may be disposed in a peripheral area 200N.

The first sensing electrodes 210 and the second sensing electrodes 220 may be electrically connected to corresponding lines among the lines 230.

FIGS. 11A, 11B, 12 and 13 show a single routing structure in which one first sensing electrode 210 is connected to one line 230 and one second sensing electrode 220 is connected to one line 230 as a representative example. However, embodiments of the present disclosure are not limited thereto. As an example, each of the second sensing electrodes 220 may be connected to two lines 230. According to an embodiment, each of the first sensing electrodes 210 may be connected to two lines 230, and each of the second sensing electrodes 220 may be connected to two lines 230.

The pads 240 may be electrically connected to the lines 230, respectively. The input sensor 200 may be electrically connected to the sensor controller 200C (refer to FIG. 3) via the pads 240. However, this is merely an example. According to an embodiment, the pads 240 may be disposed in the display panel 100 (refer to FIG. 3). In this case, the lines 230 may be electrically connected to the pads 240 via contact holes.

According to an embodiment, the sensor controller 200C may generate a first signal PPS having an in-phase and a second signal APS having an opposed-phase of the first signal PPS. The first signal PPS may be referred to as the in-phase signal, and the second signal APS may be referred to as the opposed-phase signal. That is, the second signal APS may have a phase difference of about 180 degrees with respect to the first signal PPS. As an example, the first signal PPS may have a positive phase, and the second signal APS may have a negative phase. An intensity of the second signal APS may be about the same as an intensity of the first signal PPS. In this case, the first signal PPS may be the uplink signals S1a and S1b of FIG. 9A.

FIG. 11A independently shows the first sensor part 214 disposed in a first area AA1 of FIG. 12, and FIG. 11B independently shows the second sensor part 224 disposed in the first area AA1 of FIG. 12.

Referring to FIGS. 11A, 11B and 12, when the input device 2000 is disposed at a first input position CP1 in the first mode MD1 (refer to FIG. 7A), the input sensor 200 may sense coordinates of the first input position CP1. The sensor controller 200C may define the first area AA1 based on the first input position CP1. The first area AA1 may be defined as an area in which the first input position CP1 is located. A second area AA2 may be defined as an area in which the first input position CP1 is not located. The first area AA1 may be surrounded by the second area AA2. The first area AA1 may overlap the first input position CP1. The first area AA1 may be a portion of the active area 200A. The first sensor part 214 and the second sensor part 224 may be disposed in the first area AA1. Compensation parts 212 and 223 may be disposed in the second area AA2.

The first signal PPS may be applied to the first area AA1, and the second signal APS may be applied to the second area AA2. That is, according to an embodiment, the sensor controller 200C may determine the first area AA1 based on the first input position CP1 of the input device 2000 and may apply the first signal PPS to the first sensor part 214 and the second sensor part 224 disposed in the first area AA1.

In FIG. 11A, at least one first sensing electrode among the first sensing electrodes 210 may form the first sensor part 214. The other first sensing electrodes except the at least one first sensing electrode among the first sensing electrodes 210 may form a first compensation part 212. The first sensor part 214 may be disposed in the first area AA1-1. The first compensation part 212 may be disposed in the second area AA2-1. The first area AA1-1 may be determined based on the first input position CP1 indicated by the input device 2000. That is, the first area AA1-1 may be defined adjacent to the first input position CP1. The second area AA2-1 may be defined in the active area 200A except the first area AA1-1. The second area AA2-1 may surround the first area AA1-1 and may be provided in plural. The first compensation part 212 may be provided in plural, and the first compensation parts 212 may be respectively disposed in the second areas AA2-1. The first compensation parts 212 may be spaced apart from each other with the first sensor part 214 interposed therebetween.

The sensor controller 200C may apply the first signal PPS to the first sensor part 214 and may apply the second signal APS to the first compensation part 212.

The first area AA1-1 may have a size determined to correspond to about 20 percent to about 40 percent of a size of the active area 200A. That is, the sensor controller 200C may determine a width WT1 in the second direction DR2 of the first sensor part 214 disposed in the first area AA1-1 to correspond to about 20 percent to about 40 percent of a width HWT1 in the second direction DR2 of the active area 200A.

In FIG. 11B, at least one second sensing electrode among the second sensing electrodes 220 may form the second sensor part 224. The other second sensing electrodes except the at least one second sensing electrode among the second sensing electrodes 220 may form a second compensation part 223. The second sensor part 224 may be disposed in the first area AA1-2. The second compensation part 223 may be disposed in the second area AA2-2. The first area AA1-2 may be determined based on the first input position CP1 indicated by the input device 2000. That is, the first area AA1-2 may be defined adjacent to the first input position CP1. The second area AA2-2 may be defined in the active area 200A except the first area AA1-2. The second area AA2-2 may surround the first area AA1-2 and may be provided in plural. The second compensation part 223 may be provided in plural, and the second compensation parts 223 may be respectively disposed in the second areas AA2-2. The second compensation parts 223 may be spaced apart from each other with the second sensor part 224 interposed therebetween.

The sensor controller 200C may apply the first signal PPS to the second sensor part 224 and may apply the second signal APS to the second compensation part 223.

The first area AA1-2 may have a size determined to correspond to about 20 percent to about 40 percent of a size of the active area 200A. That is, the sensor controller 200C may determine a width WT2 in the first direction DR1 of the second sensor part 224 disposed in the first area AA1-2 to correspond to about 20 percent to about 40 percent of a width HWT2 in the first direction DR1 of the active area 200A.

In FIG. 12, the sensor controller 200C may define the second area AA2 on the basis of the first area AA1. The second area AA2 may be defined adjacent to the first area AA1. In an embodiment, the second area AA2 does not overlap the first area AA1. The second area AA2 may refer to the area except the first area AA1 in the active area 200A.

The first area AA1 may include the first area AA1-1 in the first direction DR1 and the first area AA1-2 in the second direction DR2, which are determined around the first input position CP1 of the input device 2000. The first sensor part 214 and the second sensor part 224 may be arranged to cross each other around the first input position CP1 in the first area AA1.

The first sensor part 214 may have a size determined to correspond to about 20 percent to about 40 percent of a size of the entire active area 200A, and the second sensor part 224 may also have a size determined to correspond to about 20 percent to about 40 percent of the size of the entire active area 200A. Accordingly, the sensor controller 200C may determine the size of the first area AA1 in which the first sensor part 214 and the second sensor part 224 are included to correspond to about 40 percent to about 60 percent of the size of the entire active area 200A. In an embodiment, the sensor controller 200C may determine the size of the first area AA1 in which the first sensor part 214 and the second sensor part 224 are included to correspond to about 50 percent. That is, a ratio of the size of the first area AA1 to the size of the second area AA2 may be set to 5:5, 6:4, or 4:6 in the input sensor 200.

The first area AA1 may correspond to a half of the active area 200A, and the other half of the active area 200A may be determined as the second area AA2. The second area AA2 may be determined depending on the determined first area AA1. The second area AA2 may include the second area AA2-1 in the first direction DR1 and the second area AA2-2 in the second direction DR2. The first input position CP1 is not located in the second area AA2-1 or the second area AA2-2. The second area AA2 may include a plurality of areas surrounding the first area AA1, which may be spaced apart from each other.

The compensation parts 212 and 223 may be disposed in the second area AA2. The compensation parts 212 and 223 may be provided in plural, and the compensation parts 212 and 223 may be spaced apart from each other with at least one of the first sensor part 214 and the second sensor part 224.

As described above, signals having opposite phases to each other may be respectively applied to the first area AA1 and the second area AA2 in FIG. 12. The sensor controller 200C may apply the first signal PPS to the first sensor part 214 and the second sensor part 224 of the first area AA1 and may apply the second signal APS to the compensation parts 212 and 223 of the second area AA2. The first signal PPS and the second signal APS may have opposite phases to each other. As an example, the first signal PPS may have the positive phase, and the second signal APS may have the negative phase.

According to an embodiment, the first signal PPS and the second signal APS may be applied to the second electrode CE (refer to FIG. 5) due to the parasitic capacitance Cb (refer to FIG. 5) formed between the input sensor 200 and the second electrode CE (refer to FIG. 5). The first signal PPS and the second signal APS applied to the second electrode CE (refer to FIG. 5) commonly disposed over the pixels PX (refer to FIG. 6) as an integral shape may cancel each other.

The first area AA1 and the second area AA2 may have substantially the same size as each other. The intensity of the first signal PPS may be the same as the intensity of the second signal APS. Accordingly, the first signal PPS applied to the first area AA1 and the second signal APS applied to the second area AA2 may efficiently cancel each other in the second electrode CE (refer to FIG. 5).

According to embodiments of the present disclosure, the first signal PPS and the second signal APS applied to the second electrode CE (refer to FIG. 5) may cancel each other, and thus, the first signal PPS may be prevented from being applied to each of the data lines DL1 to DLm (refer to FIG. 6). The data signal DS (refer to FIG. 6) applied to each of the data lines DL1-DLm (refer to FIG. 6) may be prevented from colliding with or interfering with the first signal PPS, and thus, the data signal DS (refer to FIG. 6) may be prevented from being distorted. Accordingly, a flicker phenomenon, which may be caused by the data signal DS (refer to FIG. 6) distorted by the first signal PPS, may be removed or reduced, and as a result, image quality may be increased.

Different from the input device 2000 disposed at the first input position CP1 in FIG. 12, the input device 2000 is disposed at a second input position CP2 in FIG. 13.

In the first mode MD1 (refer to FIG. 7A), the input device 2000 may move to the second input position CP2 from the first input position CP1 of FIG. 12.

According to an embodiment, the sensor controller 200C may detect the input position of the input device in real time. The sensor controller 200C may track the input position of the input device 2000 in real time through the position detection signal.

In FIG. 13, the sensor controller 200C may detect coordinates of the second input position CP2 in the input sensor 200 again along the movement of the input device 2000. The sensor controller 200C may define the first area AA1 again based on the coordinates of the detected second input position CP2.

The first area AA1 may overlap the second input position CP2. In an embodiment, the first area AA1 may be continuously defined along a movement path of the coordinates of the input device 2000 detected by the input sensor 200. The first area AA1 may be defined based on at least one first sensing electrode disposed in the first sensor part 214 and at least one second sensing electrode disposed in the second sensor part 224. The sensor controller 200C may apply the first signal PPS to the first area AA1 as the uplink signal ULS (refer to FIG. 7B).

The sensor controller 200C may define the second area AA2 different from first area AA1 based on the first area AA1. The second area AA2 may be defined adjacent to the first area AA1. In an embodiment, the second area AA2 does not overlap the first area AA1. The second area AA2 may be defined based on the compensation parts 212 and 223. The second signal APS having an opposed phase to that of the first signal PPS may be applied to the second area AA2 as the uplink signal ULS (refer to FIG. 7B).

According to embodiments of the present disclosure, the position of the first area AA1 may be changed depending on the input position at which the input device 2000 is sensed. The uplink signal ULS (refer to FIG. 7B) may be applied to the input device 2000 from the first area AA1. Although the input device 2000 moves to the second input position CP2 from the first input position CP1 in the first mode MD 1 (refer to FIG. 7A), the input device 2000 may receive the uplink signal ULS (refer to FIG. 7B) from the input sensor 200, and the input sensor 200 may sense the input by the input device 2000. Accordingly, the sensing reliability of the input sensor 200 may be increased.

Figure 14:
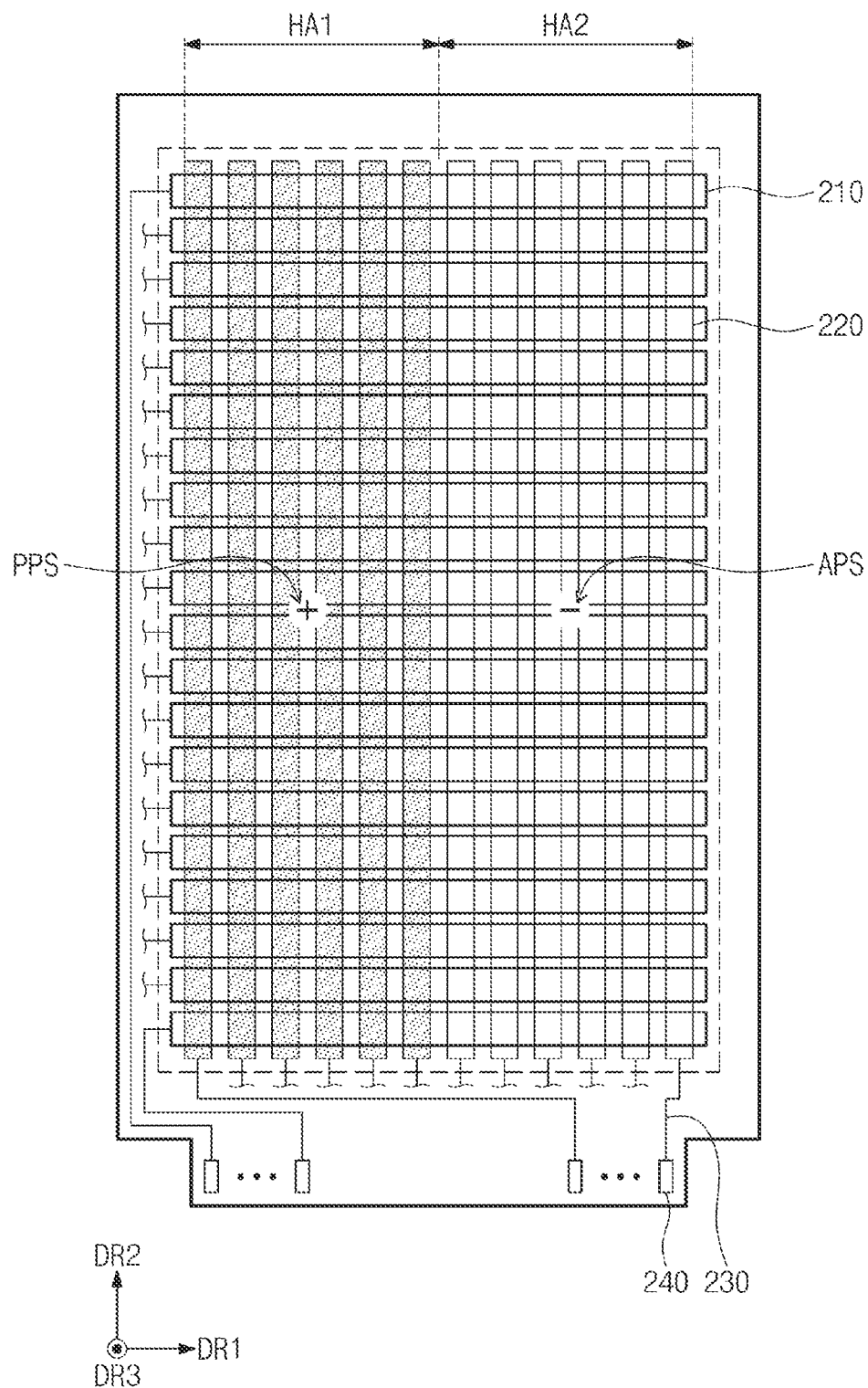
FIGS. 14 and 15 are plan views of an input sensor operated in a second mode according to an embodiment of the present disclosure.
Figure 15:
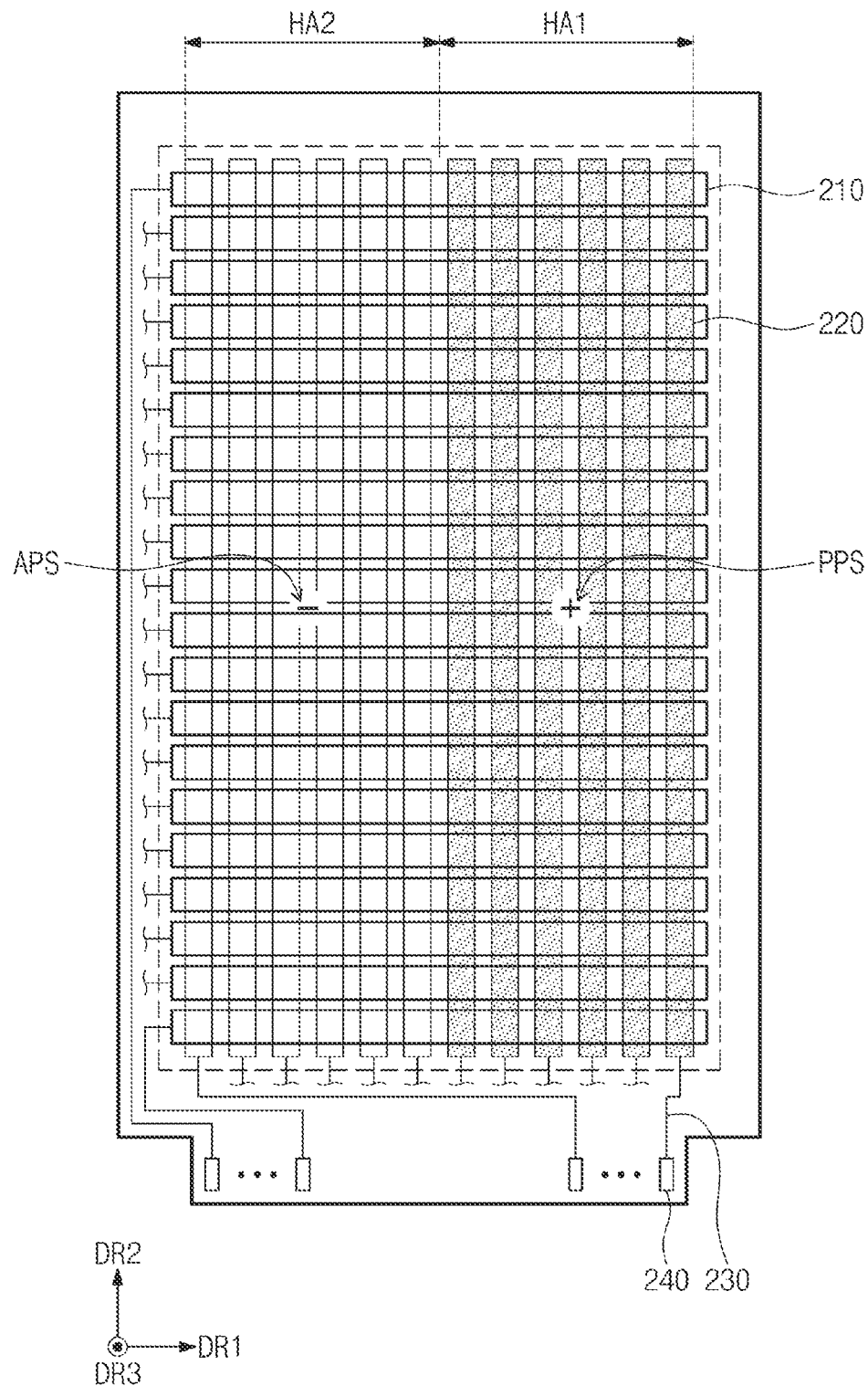

FIGS. 14 and 15 are plan views of the input sensor in the second mode according to an embodiment of the present disclosure. In the second mode, the input sensor 200 may be operated to sense the input by the user's touch.

According to an embodiment, the input sensor of FIG. 14 and the input sensor of FIG. 15 may alternately appear in the second mode of the input sensor 200. That is, FIGS. 14 and 15 show different input sensors in two consecutive frames.

Referring to FIGS. 14 and 15, in the second mode, a first area HA1 and a second area HA2, which are obtained by dividing the active area 200A, may be defined in the input sensor 200. A first uplink signal PPS and a second uplink signal APS having the opposite phase to that of the first uplink signal PPS may be applied to the first area HA1 and the second area HA2, respectively. As an example, the first uplink signal PPS having the positive phase may be applied to the first area HAL and substantially simultaneously, the second uplink signal APS having the negative phase may be applied to the second area HA2.

The first uplink signal PPS and the second uplink signal APS may be applied to the first area HA1 and the second area HA2 to sense the input device 2000 approaching thereto in the second mode. Hereinafter, the first uplink signal PPS will be referred to as the first signal PPS, and the second uplink signal APS will be referred to as the second signal APS.

The sensor controller 200C (refer to FIG. 3) may apply signals having different phases from each other to two areas of the input sensor 200. That is, the first area HA1 and the second area HA2 may be defined by the first signal PPS and the second signal APS, which have different phases from each other and are provided by the sensor controller 200C.

The sensor controller 200C may invert the position of the first area HA1 to which the first signal PPS is applied and the position of the second area HA2 to which the second signal APS is applied every frame.

In FIG. 14, the first area HA1 may be disposed at a left side in the first direction DR1, and the second area HA2 may be disposed at a right side in the first direction DR1. In FIG. 15, the first area HA1 may be disposed at the right side in the first direction DR1, and the second area HA2 may be disposed at the left side in the first direction DR1.

In the consecutive first and second frames, the sensor controller may apply the first signal PPS and the second signal APS to the input sensor 200 in the first frame as shown in FIG. 14 and may apply the first signal PPS and the second signal APS to the input sensor in the second frame as shown in 15. Accordingly, the flicker phenomenon may be reduced or prevented by applying the signals having opposite phases from each other to the divided areas in the second mode.

According to an embodiment, the first signal PPS and the second signal APS may be sequentially and alternately applied to the first area HA1, and the second signal APS and the first signal PPS may be sequentially and alternately applied to the second area HA2. Accordingly, the approach of the input device may be detected from any direction of the input sensor.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An electronic device, comprising:
   a display panel;
   an input sensor disposed on the display panel and comprising a plurality of first sensing electrodes extending in a first direction and a plurality of second sensing electrodes extending in a second direction crossing the first direction; and
   a sensor controller connected to the input sensor,
   wherein a first area and a second area are defined in the input sensor based on an input position to which an input generated by an input device is applied,
   the input position is located in the first area and is not located in the second area, and the sensor controller applies a first signal to at least one first sensing electrode disposed in the first area among the first sensing electrodes and to at least one second sensing electrode disposed in the first area among the second sensing electrodes, and applies a second signal having an opposite phase to a phase of the first signal to at least one first sensing electrode disposed in the second area among the first sensing electrodes and to at least one second sensing electrode disposed in the second area among the second sensing electrodes,
   wherein the input sensor further comprises:
   a first sensor part comprising the at least one first sensing electrode disposed in the first area among the first sensing electrodes; and
   a second sensor part comprising the at least one second sensing electrode disposed in the first area among the second sensing electrodes,
   wherein the first sensor part crosses the second sensor part with respect to the input position,
   the input sensor is operated in a first mode in which the input generated by the input device is sensed and in a second mode in which an input generated by a user's touch is sensed,
   the input sensor comprises an active area comprising the first area and the second area, and
   the sensor controller determines a width in the second direction of the first sensor part to correspond to about 20 percent to about 40 percent of a width in the second direction of the active area in the first mode, and determines a width in the first direction of the second sensor part to correspond to about 20 percent to about 40 percent of a width in the first direction of the active area.

2. The electronic device of claim 1, wherein the input sensor further comprises:
   a plurality of compensation parts comprising the first sensing electrodes disposed in the second area among the first sensing electrodes and the second sensing electrodes disposed in the second area among the second sensing electrodes,
   wherein the compensation parts are spaced apart from each other with at least one of the first sensor part and the second sensor part interposed therebetween.

3. The electronic device of claim 2, wherein the first area has substantially a same size as a size of the second area.

4. The electronic device of claim 1, wherein the sensor controller senses an approach of the input device in the second mode by applying an uplink signal to the first sensing electrodes and the second sensing electrodes, and operates in the first mode when the approach of the input device is sensed via the first sensing electrodes and the second sensing electrodes.

5. The electronic device of claim 4, wherein the sensor controller senses the approach of the input device by receiving a downlink signal from the input device via the first sensing electrodes and the second sensing electrodes.

6. The electronic device of claim 4, wherein the uplink signal is one of a first uplink signal and a second uplink signal, and
   the sensor controller alternately applies the first uplink signal and the second uplink signal, which have opposite phases to each other, to the first sensing electrodes and the second sensing electrodes in the second mode.

7. The electronic device of claim 1, wherein the sensor controller detects a first input position at which the input generated by the input device is sensed in the input sensor, and defines the first area and the second area based on the detected first input position when the input generated by the input device is sensed via the at least one first sensing electrode disposed in the first area and the at least one second sensing electrode disposed in the first area in the first mode.

8. The electronic device of claim 7, wherein, when the input position to which the input generated by the input device is applied moves from the first input position to a second input position different from the first input position, the sensor controller again defines the first area and the second area in the input sensor based on the second input position.

9. The electronic device of claim 1, wherein the display panel comprises:
   a light emitting element,
   wherein the light emitting element comprises a first electrode, a second electrode disposed on the first electrode, and a light emitting layer disposed between the first electrode and the second electrode, and
   the input sensor is disposed on the second electrode.

10. An electronic device, comprising:
    a display panel;
    an input sensor disposed on the display panel and comprising a plurality of first sensing electrodes extending in a first direction and a plurality of second sensing electrodes extending in a second direction crossing the first direction; and
    a sensor controller connected to the input sensor,
    wherein a first area and a second area are defined in the input sensor based on an input position to which an input generated by an input device is applied,
    the input position is located in the first area and is not located in the second area, and
    the sensor controller applies a first signal to at least one first sensing electrode disposed in the first area among the first sensing electrodes and to at least one second sensing electrode disposed in the first area among the second sensing electrodes, and applies a second signal having an opposite phase to a phase of the first signal to at least one first sensing electrode disposed in the second area among the first sensing electrodes and to at least one second sensing electrode disposed in the second area among the second sensing electrodes, wherein the input sensor further comprises:

a first sensor part comprising the at least one first sensing electrode disposed in the first area among the first sensing electrodes; and a second sensor part comprising the at least one second sensing electrode disposed in the first area among the second sensing electrodes, wherein the first sensor part crosses the second sensor part with respect to the input position, wherein the input sensor is operated in a first mode in which the input generated by the input device is sensed and in a second mode in which an input generated by a user's touch is sensed, the sensor controller senses an approach of the input device in the second mode by applying an uplink signal to the first sensing electrodes and the second sensing electrodes, and operates in the first mode when the approach of the input device is sensed via the first sensing electrodes and the second sensing electrodes, the uplink signal is one of a first uplink signal and a second uplink signal, and the sensor controller alternately applies the first uplink signal and the second uplink signal, which have opposite phases to each other, to the first sensing electrodes and the second sensing electrodes in the second mode.

11. The electronic device of claim 10, wherein the input sensor further comprises:

a plurality of compensation parts comprising the first sensing electrodes disposed in the second area among the first sensing electrodes and the second sensing electrodes disposed in the second area among the second sensing electrodes, wherein the compensation parts are spaced apart from each other with at least one of the first sensor part and the second sensor part interposed therebetween.

12. The electronic device of claim 11, wherein the first area has substantially a same size as a size of the second area.

13. The electronic device of claim 10, wherein the sensor controller senses the approach of the input device by receiving a downlink signal from the input device via the first sensing electrodes and the second sensing electrodes.

14. The electronic device of claim 10, wherein the sensor controller detects a first input position at which the input generated by the input device is sensed in the input sensor, and defines the first area and the second area based on the detected first input position when the input generated by the input device is sensed via the at least one first sensing electrode disposed in the first area and the at least one second sensing electrode disposed in the first area in the first mode.

15. The electronic device of claim 14, wherein, when the input position to which the input generated by the input device is applied moves from the first input position to a second input position different from the first input position, the sensor controller again defines the first area and the second area in the input sensor based on the second input position.

16. The electronic device of claim 10, wherein the display panel comprises:

a light emitting element, wherein the light emitting element comprises a first electrode, a second electrode disposed on the first electrode, and a light emitting layer disposed between the first electrode and the second electrode, and the input sensor is disposed on the second electrode.

\* \* \* \* \*